United States Patent [19]

Sweitzer et al.

[11] Patent Number: 6,018,617
[45] Date of Patent: Jan. 25, 2000

[54] TEST GENERATING AND FORMATTING SYSTEM

[75] Inventors: Keith R. Sweitzer; Karl E. Sweitzer, both of Moorepark, Calif.

[73] Assignee: Advantage Learning Systems, Inc., Wisconsin Rapids, Wis.

[21] Appl. No.: 08/903,573

[22] Filed: Jul. 31, 1997

[51] Int. Cl.[7] ....................................... G09B 3/00
[52] U.S. Cl. .......................... 395/114; 395/101; 395/102; 395/105; 395/109; 395/110; 395/111; 395/115; 395/116; 395/117; 434/118; 434/169; 434/201; 434/322; 434/323; 434/350; 434/353; 434/362; 706/927; 702/108
[58] Field of Search ..................................... 395/101–102, 395/105, 109–111, 114–117; 434/118, 169, 201, 322, 323, 350, 353, 362; 706/927; 702/108

[56] References Cited

PUBLICATIONS

William K. Bradford Publishing K–12 Mathematics Software catalog, 1993.

*Primary Examiner*—Scott Rogers
*Assistant Examiner*—Lance W. Sealey
*Attorney, Agent, or Firm*—Godfrey & Kahn, S.C.

[57] ABSTRACT

A method and system for generating and formatting information, specifically test questions, in a desirable and predetermined manner. The system has dynamic-content and dynamic-presentation capabilities so that a wide variety of test problems and, ultimately, tests which consist of test problems can be created. The system includes a data processor such as a personal computer having a means for storing at least one computer program and a means for printing indicia such as a laser printer. The software component of the system includes an authoring tool which is used to create generalized expressions of a problem. A variation rules module or engine stores the variations rules which are a language for describing how to create varying questions from the generalized expression or definition of and a problem created in the authoring tool. Then another component of the software, the print engine interprets the variation rules and produces screen displays or printed tests.

13 Claims, 19 Drawing Sheets

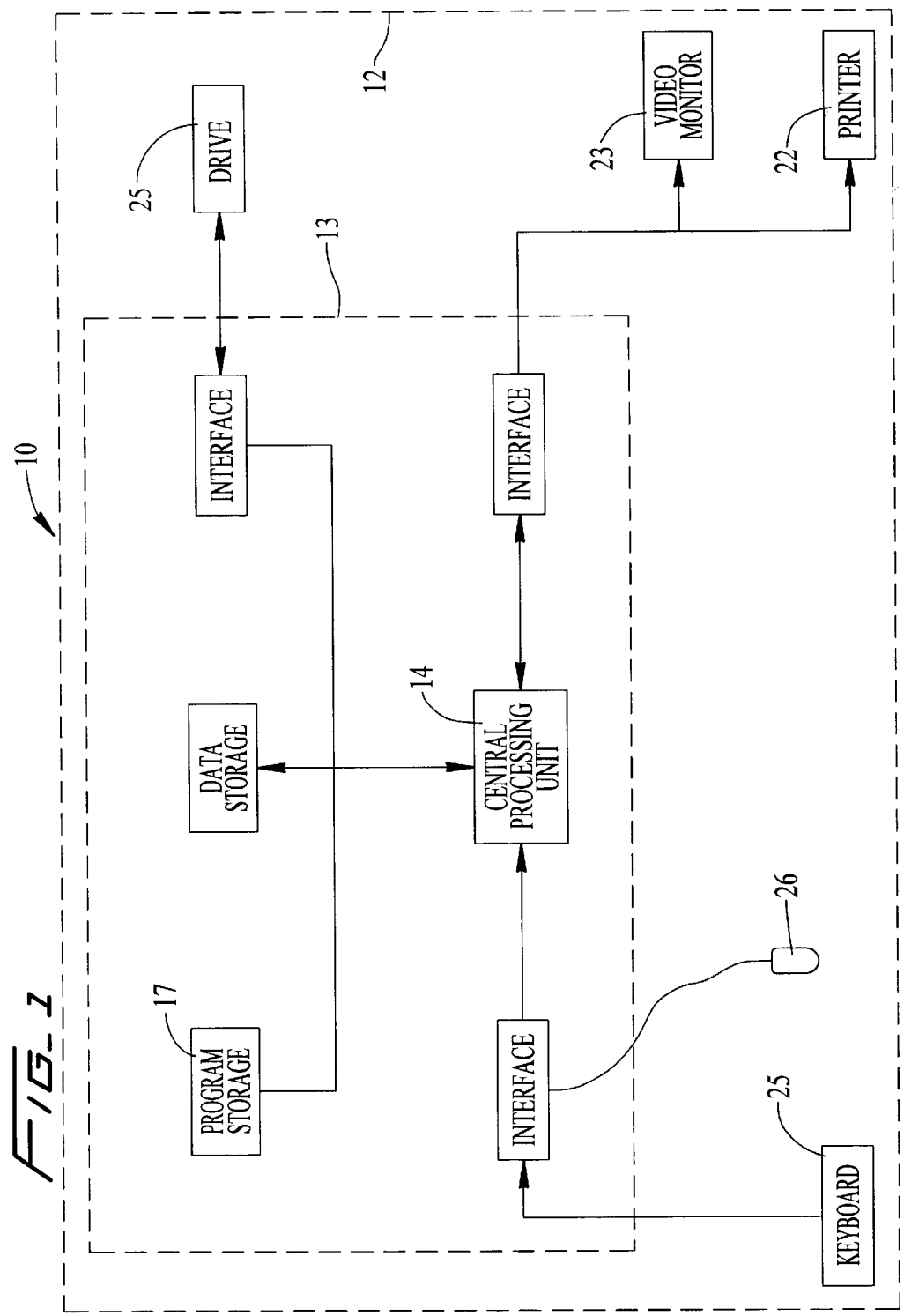

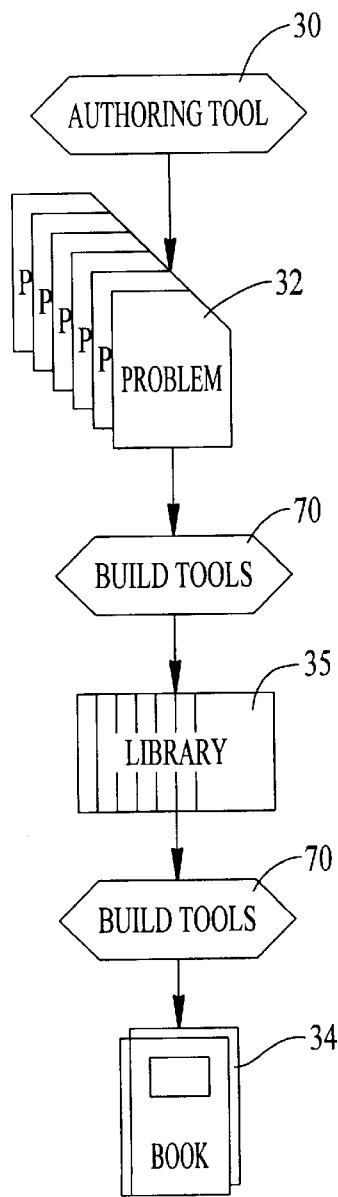
FIG._2A
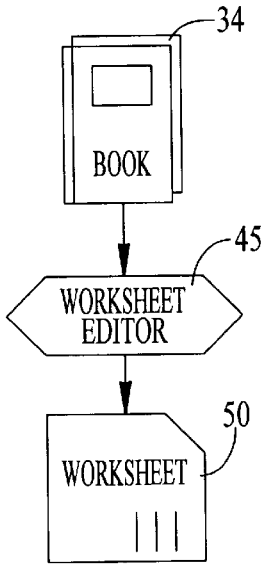
FIG._2B
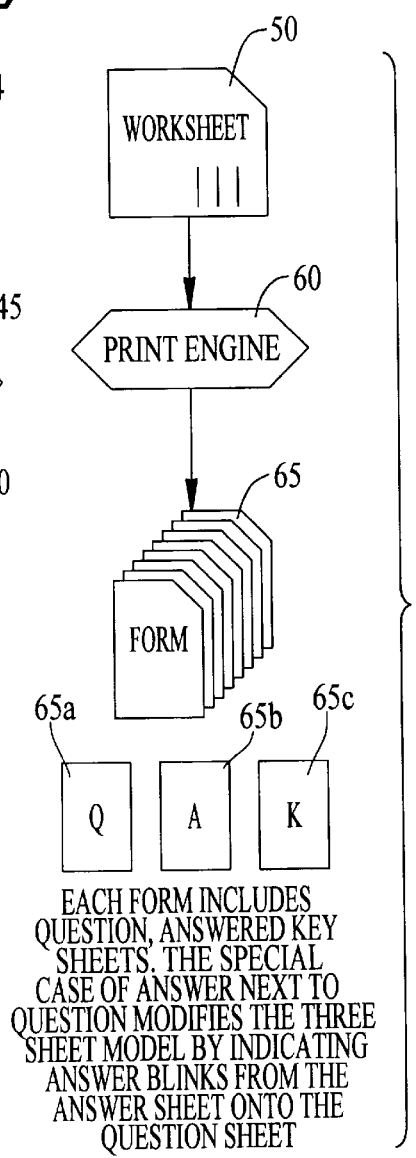
FIG._2C
EACH FORM INCLUDES QUESTION, ANSWERED KEY SHEETS. THE SPECIAL CASE OF ANSWER NEXT TO QUESTION MODIFIES THE THREE SHEET MODEL BY INDICATING ANSWER BLINKS FROM THE ANSWER SHEET ONTO THE QUESTION SHEET

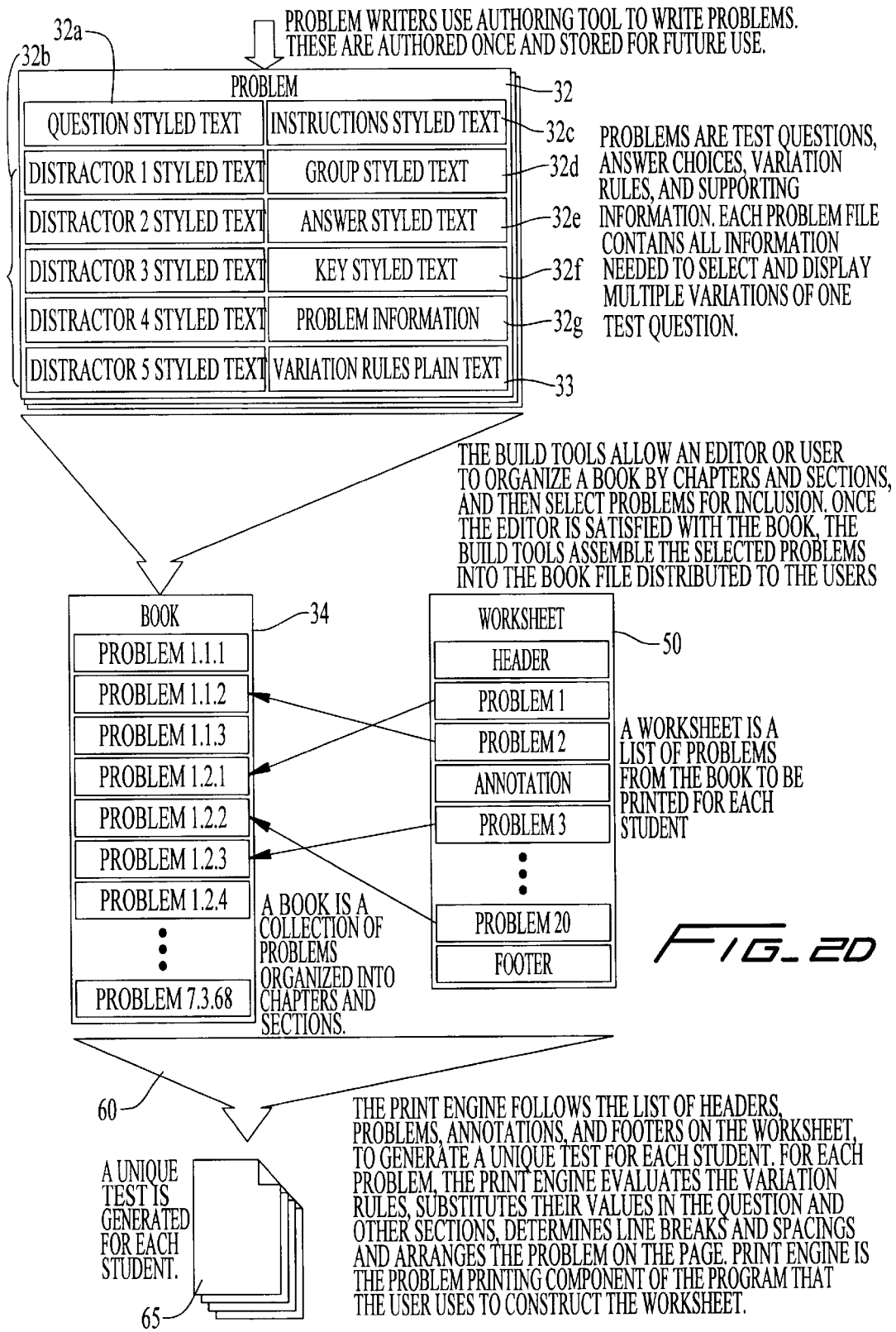

FIG_3

```
╔══════════════════ EXAMPLE AT PROBLEMS <1> ══════════════════╗
VARIATIONS:  [ 42 ] (RECOUNT)     DIFFICULTY: [ 1 ]
ADD TWO SIMPLE FRACTIONS WITHOUT REDUCING.
QUESTION

ADD: 'A' + 'B'   ~42
        ───   ───
         7    14

CORRECT ANSWER ▷           ANSWER FORMAT: [MULTIPLE CHOICE]

'C'  ~42
   ───
   14

RULES

A=RANDOM(A, 1, 9)
B=RANDOM(B, 1, 9)
REQUIRE(A<>B)
REQUIRE(A<>7)
C=A*2+B

[PREVIEW]        (NEXT VARIATION)

ADD:  4   +  1
        ───    ───
         7     14
```

Labels: 40, 36, 38

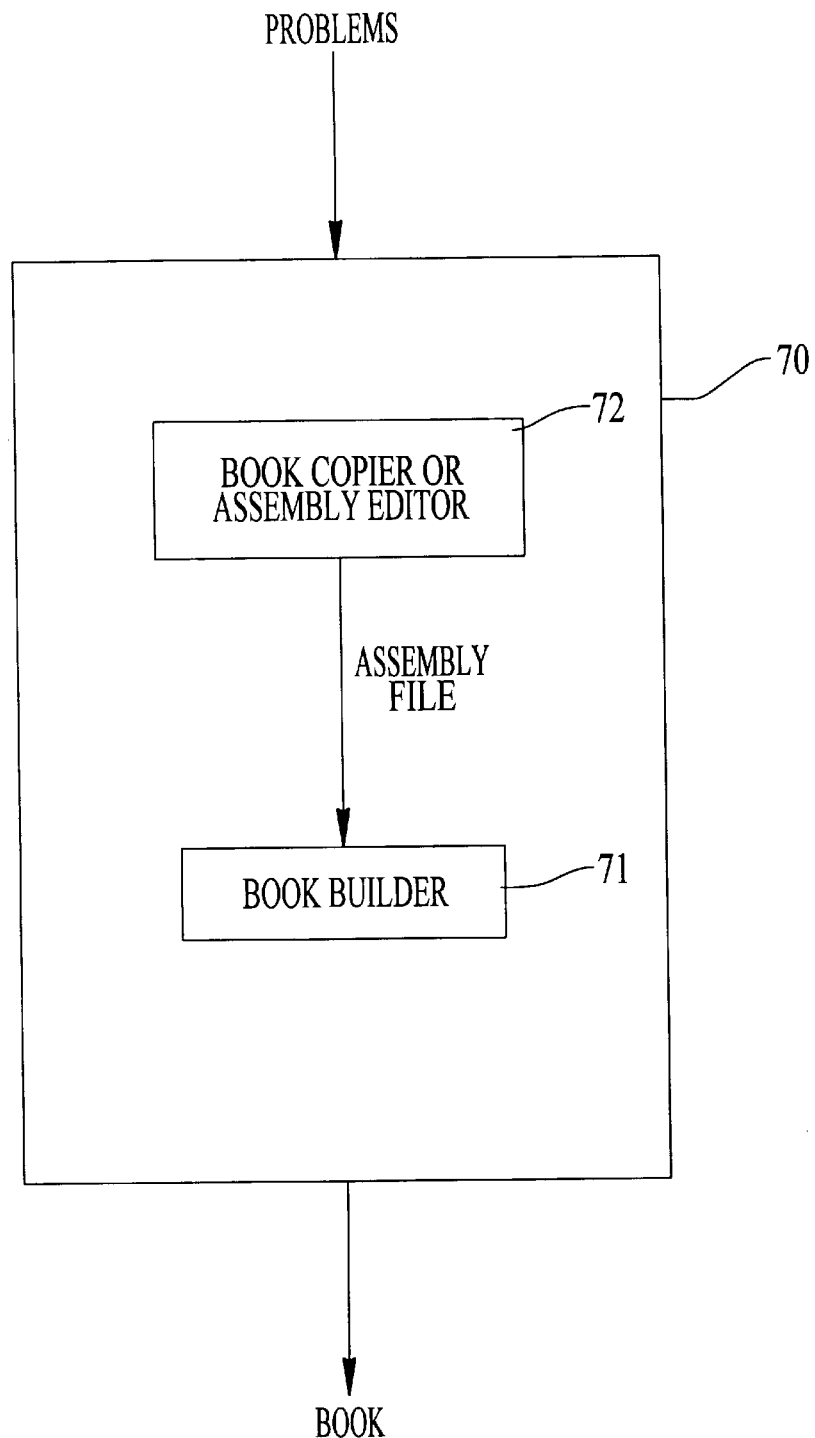
FIG_ 4A

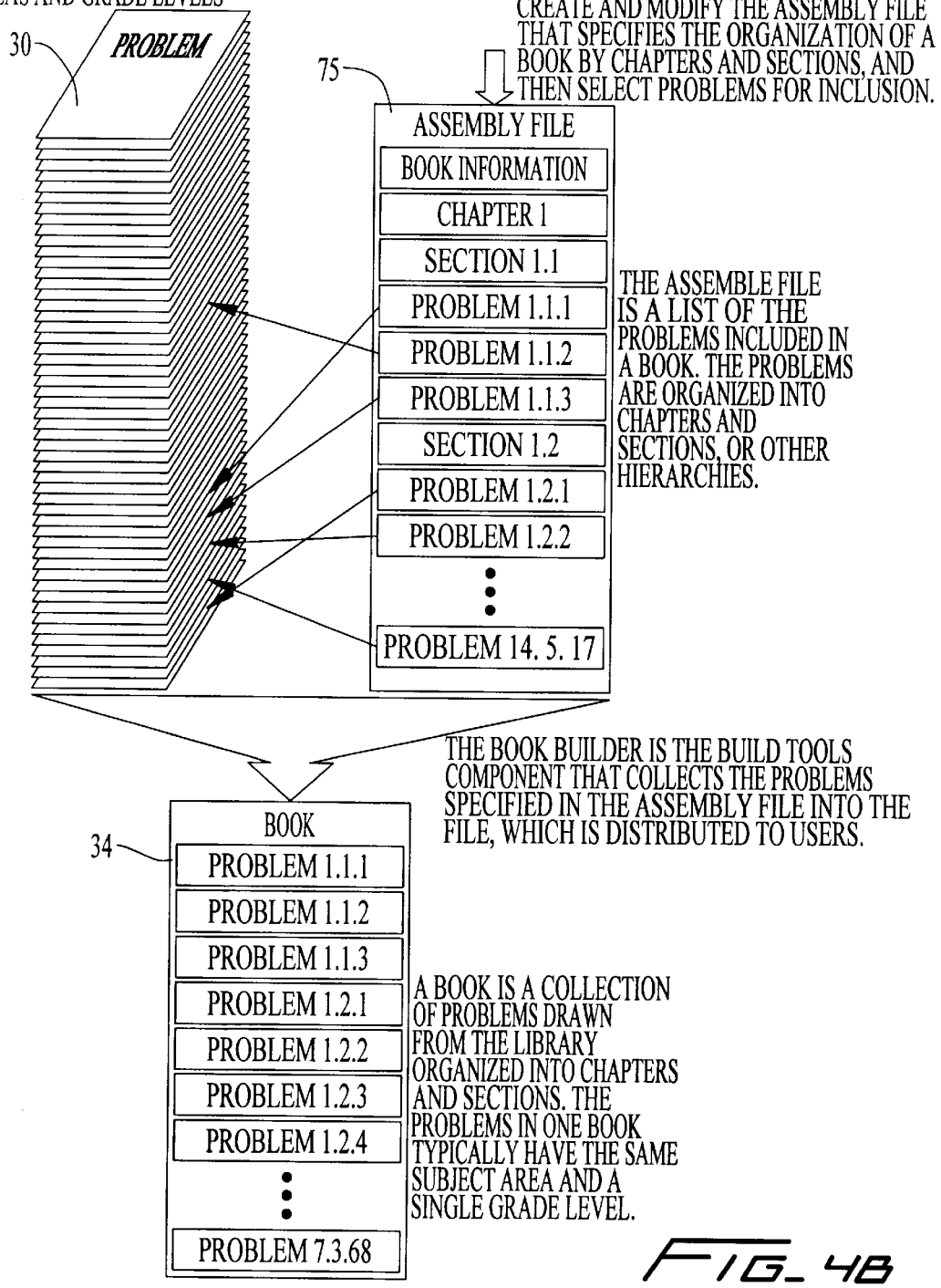
FIG_4B

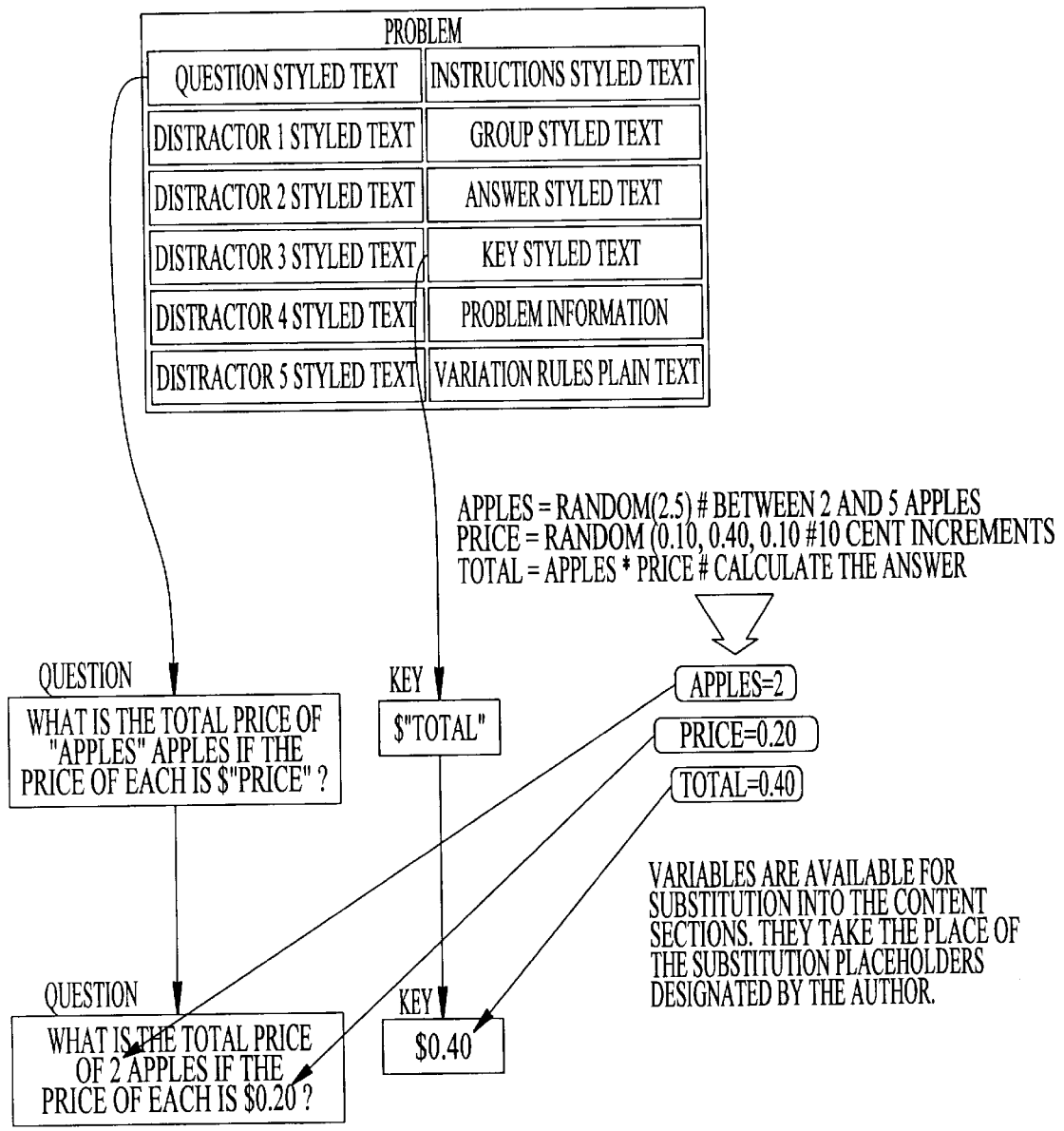
FIG_5

FIG. 6

MATH CHECK - WS1 (1 PROBLEM)
FILE EDIT BOOK WORKSHEET HELP

XEA1.BK
▽ALGEBRA 1, 2ND EDITION
 ▽TOPIC 1 - INTEGERS AND RATIONAL NUMBERS
  ▽SECTION 1 - INTRODUCTION TO INTEGERS
   ▽OBJECTIVE 1 - GRAPH INTEGERS ON A NUMBER
    [1.1.1.1]      AB CD    GRAPH INTEGERS 0
    [1.1.1.2]      AB CD    GRAPH INTEGERS 0
  ▽SECTION 2 - ADD INTEGERS
   ▽OBJECTIVE 1 - ADD TWO INTEGERS
    [1.2.1.3]      AB CD    ADD TWO INTEGERS.
    [1.2.1.4]      AB CD    ADD TWO INTEGERS.
    [1.2.1.5]      AB CD    ADD TWO INTEGERS.
    [1.2.1.6]               GRAPH INTEGERS 0
    [1.2.1.7]               GRAPH INTEGERS 0
    [1.2.1.8]               GRAPH INTEGERS 0
   △OBJECTIVE 2 - ADD THREE INTEGERS
  △SECTION 3 - SUBTRACT INTEGERS
  △SECTION 4 - MULTIPLY INTEGERS
  △SECTION 5 - DIVIDE INTEGERS
  △SECTION 6 - COMBINED OPERATIONS WITH INTEGERS
  △SECTION 3 - POWERS OF INTEGERS

WS1 (1 PROBLEM)
1. [1.1.1.1] GRAPH INTEGERS ON A NUMBER LINE.

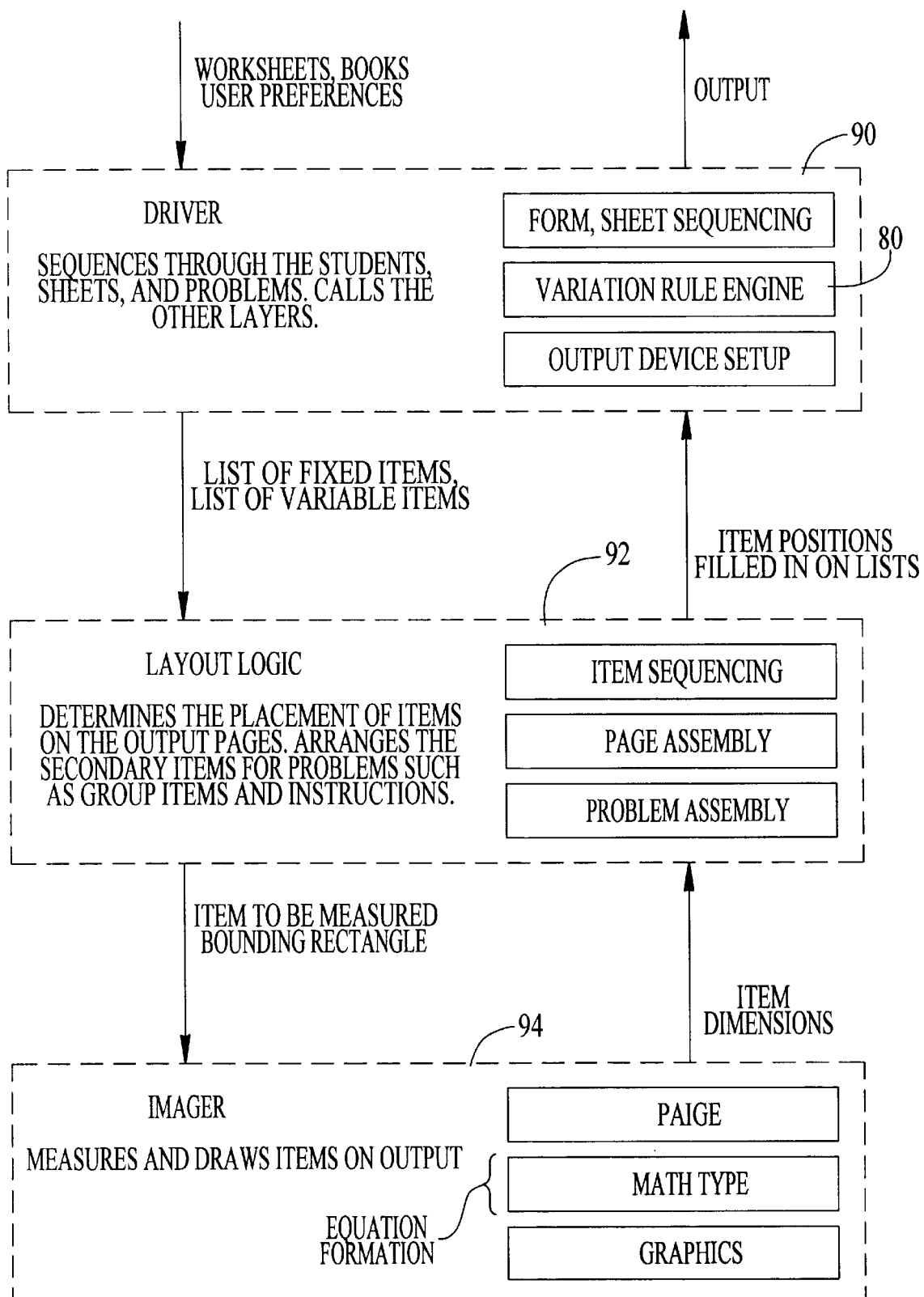
FIG_8

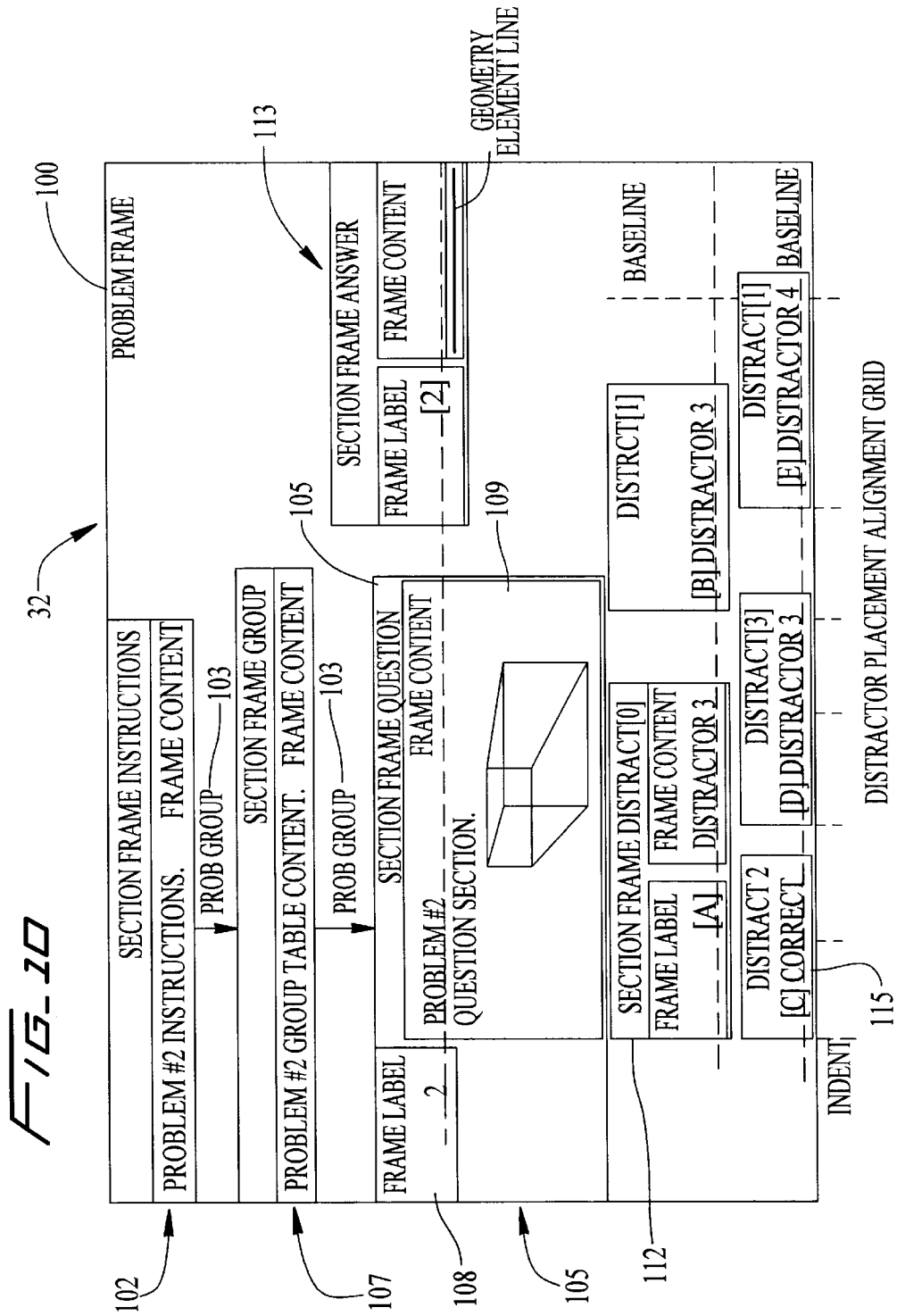
FIG_10

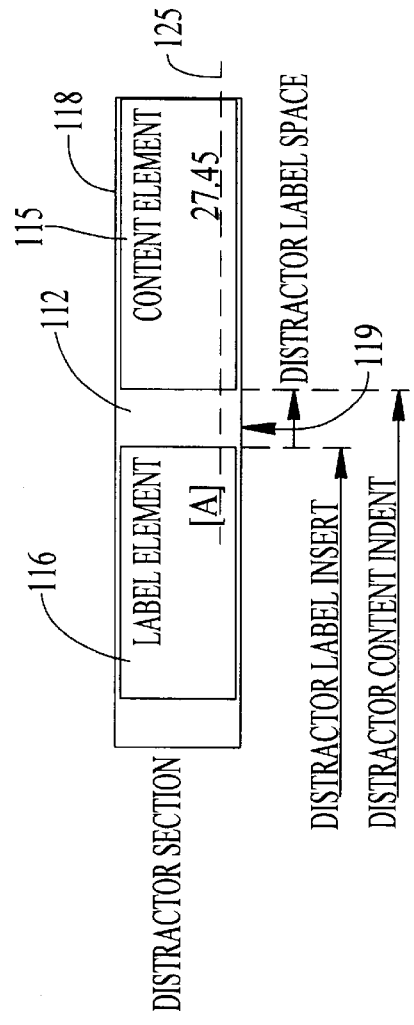
FIG_14
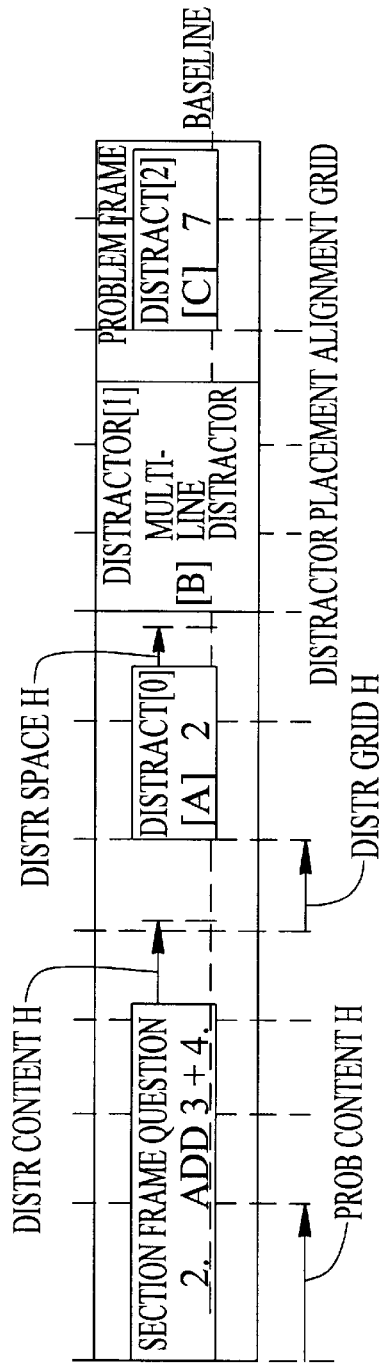
FIG_15

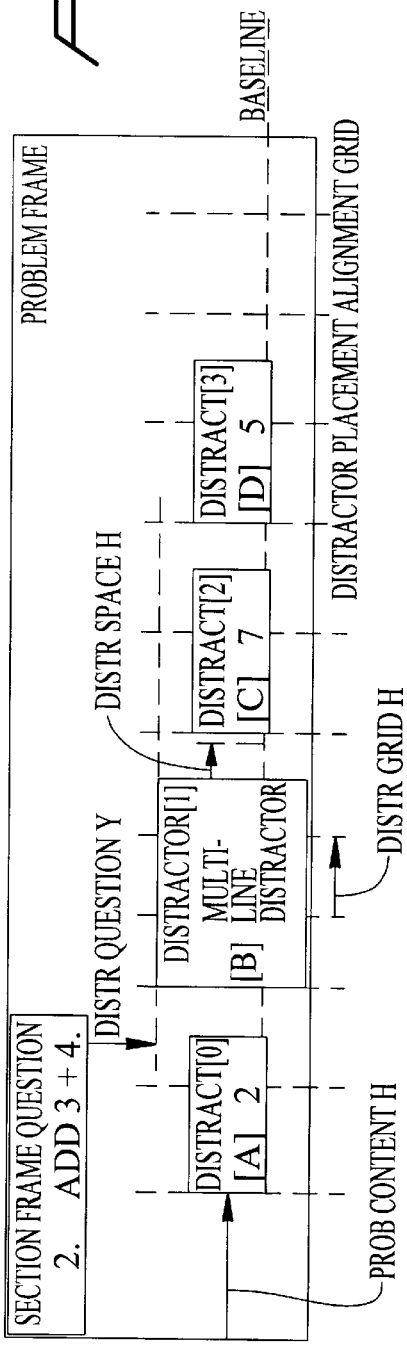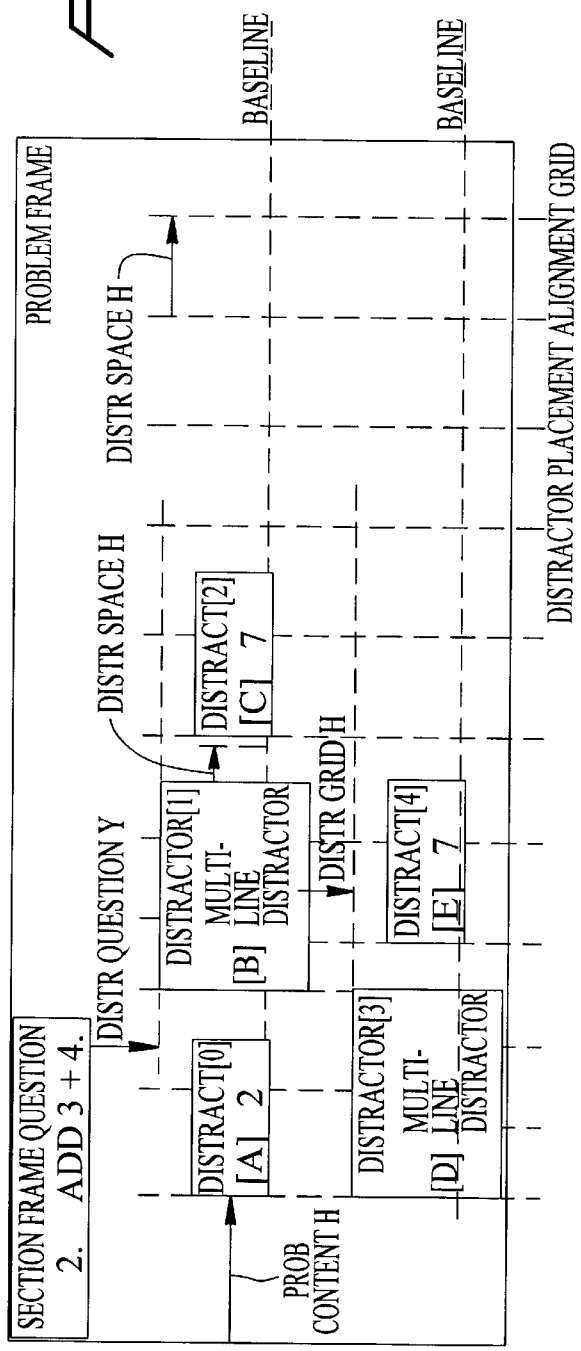

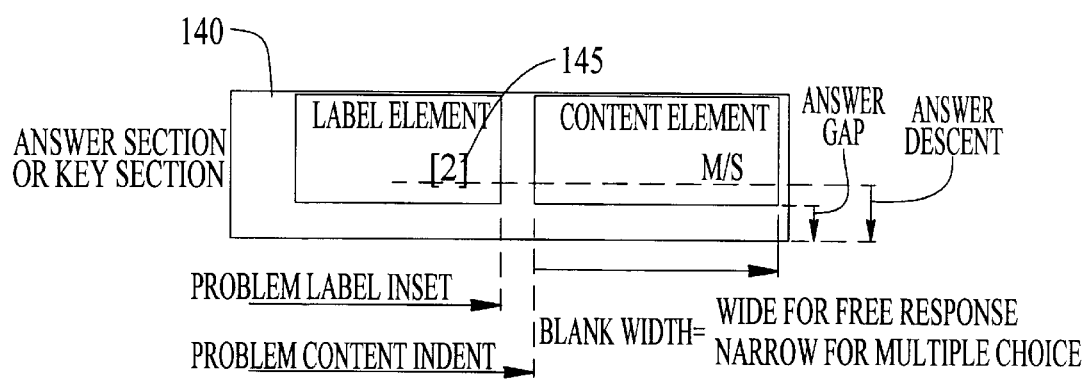

TEST GENERATING AND FORMATTING SYSTEM

BACKGROUND OF THE INVENTION

The present invention relates generally to systems used to generate and format information in a desirable and predetermined manner. More particularly, the present invention relates to methods and systems for generating printed examinations or tests containing relatively complex visual elements such as mathematical symbols, operators, expressions, graphs, and equations.

Recently, computer software has been developed to assist teachers in developing examinations or tests. In general, these types of programs permit teachers to develop, refine, and edit examinations on a computer. When the teacher has completed developing a test, a desired number of copies of the test may be printed and the test may then be administered to students. Among the educational software available, some software developers have attempted to provide software for developing math tests. The overall purpose of such software is to measure a student's understanding of a topic by posing relevant questions in a printed test or examination. The student's responses to such questions are then analyzed and graded, in some cases by computer and, in others, by hand.

There are many ways that such software can be classified. One way is to measure the manner in which the software stores and displays information. Using this criteria at least two classes have been created to date. They are as follows:

1) static-content, static-presentation programs (test banks);
2) static-content, static-presentation word processor or page layout programs (word processors).

As noted, in order to display a question or problem on a test, two things must be considered: the content of the question, and the visual presentation of that content. Depending on what class of software is being used or is available, creating and storing content and presenting it is carried out in different ways. The content of a question is the educational core, a real-world fact that the student should know, or a computational skill that the student should be capable of applying. Test bank programs (class 1) have a large number of fixed (static, or non-dynamic) items that embody the content. In these items, the content is fixed at exact values that never change, although the static test bank can alternate between a small set of similar problems. In static test bank programs, the content never changes, so the visual display of the content can be decided by a human at the time that the content is authored. Thus, the human author manually arranges the question and distractors (correct answer and several incorrect answers in multiple choice test) to yield an examination or tests with a pleasing appearance. The appearance decisions are made once, during production, by a human, and are never significantly altered after that. This is true of word processor approaches (class 2) also.

A third class of programs differ from test banks and word processors by having the capability of incorporating content that varies from question to question. However, they require a person, i.e., the author, to determine the presentation manually.

There are or have been many programs that fall within the first two classes. However, there are few if any programs that fall into the third class. Yet if a system could be developed having dynamic content and also dynamic presentation capabilities, then a wide variety of examinations could be created. Significantly, different tests of the same difficulty could be created and administered. Thus, each student would have a different exam, containing different problems and even having different ordering and formatting of problems yet still be tested on the same subject matter at the same difficulty level. While such benefits would be extremely useful in eliminating the possibility of cheating, this fourth class of dynamic content, dynamic-presentation programs has not yet been developed.

As can be appreciated, in order to have a successful math-test generating program with dynamic presentation capabilities, the software must be able to print or, more broadly, display mathematical expressions. Printing a mathematical expression has always been somewhat more difficult to accomplish than printing characters. Unlike ordinary text, which consists of relatively uniformly sized and spaced characters and spaces, mathematical expressions may also include numerals, operators, and a variety of symbols. In addition, the sizing and spacing of these components may be non-uniform. Further still, mathematical expressions may also take the form of curves on graphs, matrices, and other relatively complex forms. Thus, the methodologies used by, for example, word processing programs to produce and format textual output are not successful in a dynamic presentation setting. When the objective is to print a complete test consisting of a series of questions each containing one or more mathematical expressions, the deficiencies of existing formatting and printing technologies become even more apparent.

Furthermore, when dynamic content is desired, so that a plurality of different tests having different questions of the same difficulty can be produced, there must be a means for adjusting the formatting of tests so that they fit in the same amount of space.

Accordingly, it would be desirable to have a dynamic content and dynamic presentation software and computer system for generating math tests or other tests which may contain mathematical expressions or graphical images where the system has the capability of formatting and printing mathematical expressions. It would also be desirable to have a test generating and formatting system capable of producing a test in multiple but equally difficult forms, each form of which fits in an equal or at least similar amount of space.

OBJECTS AND SUMMARY OF THE INVENTION

Therefore, it is an object of the present invention to provide a system for producing tests or examinations with the capability of formatting mathematical expressions so that they may be printed and displayed in a uniform manner.

A further object of the present invention is to provide a system for generating mathematical problems and formatting them in a predetermined, desired manner.

A further object of the present invention is to provide a system for formatting math problems in multiple column layouts.

A further object of the present invention is to provide a dynamic-content and dynamic-presentation test generating system that has a large number of dynamic items that embody the content and where the items vary each time they are used, so exact values are seldom, if ever, repeated.

A further object of the present invention is to provide a dynamic-content and dynamic-presentation test generating system that applies general appearance guidelines at the time the examination is printed in order to format the varying content of questions; thereby eliminating the need for a human to decide where line breaks should occur, or how distractors should be stacked.

A further object of the present invention is to provide a test generating system that allows an author to state a problem as a high-level, abstract expression, from which the system generates variations and determines the presentation automatically.

These objects are achieved in a system for creating and formatting tests or examinations, in general, and, more specifically, for formatting tests that include mathematical or graphical images. Since the present invention is directed toward the creation of math tests, mathematical expressions are formatted in the context of test problems. Typically each exam includes multiple problems. The system includes a data processor such as a personal computer having a means for storing at least one computer program, such as an internal hard disk drive, and a means for presenting human readable output, such as a printer. The computer and printer are coupled in data communication with one another. A computer program or software is installed on the personal computer. The software includes a means for creating and modifying problems called an "authoring tool." The authoring tool is used to generate a single file containing a single problem. Each problem file stores an objective statement, descriptive characteristics, visual presentation and variation rules (a language for expressing algorithms). Individual problems are aggregated into collections or "books" of problems. Each problem book stores an index of problem content and an outline of the organization of that content. Problems may be developed by the user who may select the form of the problem (e.g., multiple choice or free response) and its elements using a graphical user interface. The user keys in the text for the question, answer, distractor(s), and answer key. Books are organized into chapters, sections, and objectives with problems appearing under any or multiple levels. Each problem is characterized by the sophistication of the graphical information contained within it. This information is categorized into various levels of representation. The levels of representation are: 1) textual—which includes plain ASCII text; 2) styled text—which includes style information on font, bold, italic, superscript or subscript, but not mathematical expressions; 3) expressioned—which includes mathematical expressions; and 4) graphical—which includes graphic objects. Each problem may be further characterized by a level of difficulty.

Graphical elements in a problem (in formats such as PICT and TIFF) are included as objects. Windows platform graphical objects such as BMP images may be included for display on computers using the Windows operating system. Text editing and formatting tools for laying out problems with embedded graphics are provided through the use of Paige software available from DataPak Software, Inc., Vancouver, Washington.

Equation and other mathematical expression layout is done using a routine named "MathType." MathType is called from within the text editor in the authoring tool and produces a formatted PICT object which is integrated into the problem layout upon return to the authoring tool. The interface between the authoring tool and MathType is the same as that between Microsoft Word and a routine called Equation Editor (a reduced-feature version of MathType). At any given instant, the user is operating within one of the two packages, each with its own menus, key assignments, etc.

The authoring tool is but one element in the system of the present invention and, as noted above, is used to create problems. Problems are stored on disk in files called problem books. These files contain the problem content, along with various descriptions of the problem. The present invention includes several other components including a worksheet editor. The worksheet editor is used to create and manipulate worksheets. Each worksheet consists of a selection of problems drawn from problem books along with options that control printing.

The present invention also includes a variation rules module. The variation rules are the language for describing how to generate varying questions from one problem definition. Variation rules are created in the authoring tool and interpreted in a print engine module. The print engine module processes worksheets and produces screen displays or printed tests. The print engine module follows a list of headers, problems, annotations, and footers on a worksheet to generate a unique test for each student. For each problem, the print engine evaluates the variations rules, substitutes their values in the question and other sections, determines the breaks and spacing and arranges the problem on a page (a printed sheet or screen of a video monitor).

These and other objects and advantages of the present invention will become apparent by reference to the detailed description of the invention taken in combination with the accompanying drawings.

BRIEF DESCRIPTION OF THE DRAWING

In the drawing figures:

FIG. 1 is a schematic diagram showing a workstation that includes components of the present invention.

FIG. 2A is a flow chart showing the flow of information in the present invention.

FIG. 2B is another flow chart showing the flow of information in the present invention.

FIG. 2C is another flow chart showing the flow of information in the present invention.

FIG. 2D is another flow chart showing the flow of information in the present invention.

FIG. 3 is an illustration of an editing screen created by the authoring tool of the present invention.

FIG. 4 is a schematic illustration of the operation of the variation rules engine of the present invention.

FIG. 4A is a flow chart showing a portion of the flow of information according to the present invention.

FIG. 4B is another flow chart showing a portion of the flow of information according to the present invention.

FIG. 5 is an illustration of the worksheet editor of the present invention as it would appear on a video monitor.

FIG. 6 is an illustration of the worksheet editor showing each of the user options in one of its pulldown menus.

FIG. 8 is a schematic diagram showing how the present invention formats information on a printed examination or test.

FIG. 10 is a schematic diagram showing how a test question is formatted by the present invention.

FIG. 14 is another schematic diagram showing how the present invention formats question labels and questions.

FIG. 15 is a schematic diagram showing how the present invention formats distractors.

FIG. 16 is another schematic diagram showing how the present invention formats distractors.

FIG. 17 is another schematic diagram showing how the present invention formats distractors.

FIG. 18 is a schematic diagram showing how the present invention formats answer and key sections.

DESCRIPTION OF THE PREFERRED EMBODIMENTS

Figure 7:
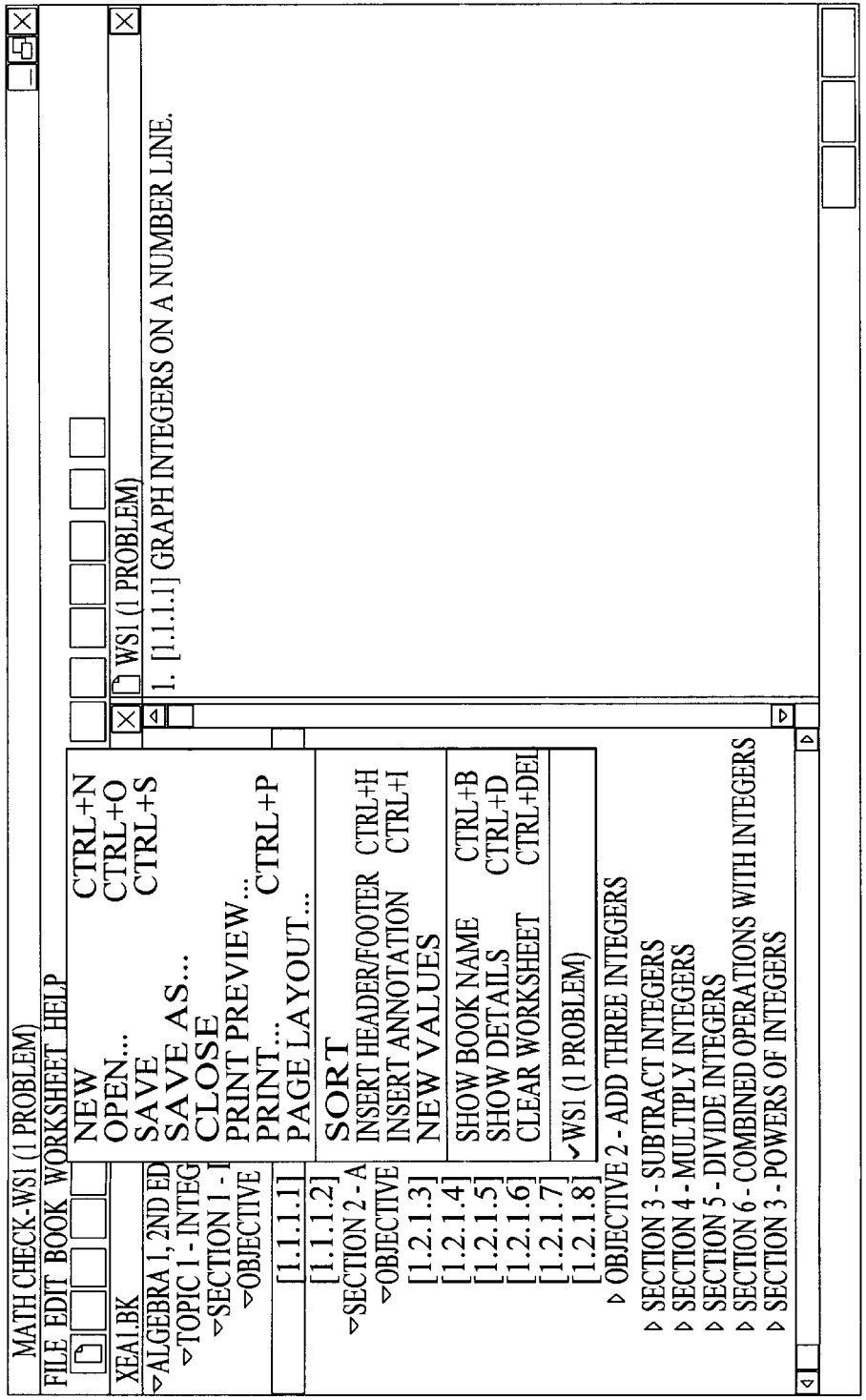
FIG. 7 is a flow chart of the print engine of the present invention.

A system 10 for formatting and printing an examination having one or more mathematical expressions is shown in FIG. 1. The system 10 includes a data processor or workstation 12, which includes a personal computer 13 and associated peripherals. The personal computer 13 has a central processing unit 14 (shown schematically), storage means or memory for storing at least one computer program 17 such as an internal hard disk drive, and means for storing information to a removable storage medium, such as a floppy disk drive 20. The computer 13 may be coupled in data communication relation to a means for printing indicia such as a laser printer 22, a video monitor 23, means for inputting information such as a keyboard 25, and a cursor control device such as a mouse 26.

Software designed in accordance with the present invention is installed on the computer 13. As can be seen by reference to FIG. 2A, the software used in the present invention includes an authoring tool 30. The authoring tool 30 is used to create one or more questions or problems 32 for incorporation into problem books 34. The problems 32 care stored on disk in the problem book 34 files. These files contain the problem content, along with various descriptions of each problem 32. Each problem book 34 is created by selecting various problems from a master library 35 using a collection of programs referred to as the build tools 70.

As shown in FIG. 2B, problem books 34 are accessed using a worksheet editor 45. Desired problems can be selected using the worksheet editor 45 to form a worksheet 50. One worksheet 50 consists of a selection of problems drawn from the problem books 34 along with options that control printing. As shown in FIG. 2C, a print engine 60 is used to produce, from the selected worksheet 50, a desired output on a sheet of paper or form 65. Typically, multiple copies of a form 65, i.e., an examination or test, are printed. Each form 65 includes a question sheet 65a, an answer sheet 65b, and an answer key 65c. The special case where the test is formatted to place an answer space next to the question modifies the three part model by integrating answer blanks onto the question sheet.

Information flow in the present invention is shown in more detail in FIG. 2D. As can be seen by reference to this figure, the end user, but more commonly, a programmer, uses the authoring tool 30 to write problems 32. Each problem includes the question text 32a; answer choices 32b (referred to as distractors); instructions 32c; group text 32d, answer text 32e, and key text 32f, if needed; problem information 32d; and variation rule 33. The build tools 70 combines multiple problems into one problem book 34. As noted above, each problem book 34 includes a collection of different problems 32. Desired problems 32 are selected using the worksheet editor 45 to create single worksheets 50 and each worksheet 50 is processed by the print engine 60. The authoring tool 30, problems 32, problem rooks 34, worksheet editor 45, and print engine 60 are discussed separately below.

The software of the present invention, when expressed in the preferred high-level programming language $C^{++}$, includes several million lines of code. Accordingly, for the sake of brevity the inventor has described herein a functional specification of the software and a detailed explanation, including the relevant source code, of the critical components of the invention. Taken together, the description and code would enable one of skill in the art to make and use the present invention. In the description that follows it is assumed that the reader is familiar with the general concepts of software engineering and programming in object-oriented programming languages and, in particular, $C^{++}$.

AUTHORING TOOL

As noted, the authoring tool 30 is used to create and modify problems 32 for inclusion in problem books 34. Tables 1 through 4 list various authoring features of interest, along with how each listed feature is supported (VR= Variation Rule; MT=MathType; UF=Utility Function; GF=Graphing Function; IM=graphic imported from another application). The operation of the authoring tool 30 will only be discussed briefly herein.

TABLE 1

| | Instance Variation | |
|---|---|---|
| | | Examples |
| VR | vary the variable | x = any literal (a, b, c, x, y, etc.) |
| VR | within a range | $1 \leq A \leq 10$ |
| VR | within a range with restrictions | $-10 \leq A \leq 10$ and $A \neq 0$ |
| | | $1 \leq B \leq 99$ and B not a perfect square |
| VR | specify increments | $2 \leq A \leq 22$ increments of 2 |
| | | $0.01 \leq B \leq .99$ increments of 0.01 |
| VR | specify increments with restrictions | $0.001 \leq A \leq 0.999$ and $\neq 0.010$, 0.020, etc. (suppress trailing zeros) |
| VR | choose variables in sets | A  B  C |
| | | 3  4  5 |
| | | 6  8  10 |
| | | 5  12  13 |
| VR | a specific set of numbers | A = 2, 3, 5, 7, 11 |

TABLE 1-continued

Instance Variation

| | | Examples |
|---|---|---|
| VR | can be words | A = Erin, Todd, Sue, John |
| VR | restrict combinations | $1 \leq A, B \leq 12$ |
| | | A and B relatively prime |
| | | $AB \neq 8$ |
| | | $A^2 \neq AB$ |
| VR | use logic | A = 1, −1 |
| | | if A = 1, then B = 10 |
| | | if B = −1, then B = 100 |

TABLE 2

Formatting

| | | Examples |
|---|---|---|
| VR | print as a decimal | answer is $\frac{A}{B}$ print as a decimal |
| VR | simple fractions | $\frac{3}{4}$ $\frac{1}{100}$ etc. |
| MT | polynomial fractions | $\frac{x^2 - 4}{x^2 - x - 9}$ |
| MT | simple radicals | $\sqrt{2}$ |
| MT | radicals other than square root | $\sqrt[3]{2}$ |
| MT | complex radicals | $\sqrt{\frac{x^2 - 5x + 9}{5}}$ |
| MT | horizontal format | Add: A + B + C |

TABLE 2-continued

Formatting

| | | Examples |
|---|---|---|
| MT | vertical format (align) | Add: |
| | | 3 |
| | | + 4 |
| MT | alignment of decimals | 3.213 |
| | | 145.203 |
| | | 2000.00001 |
| MT | align systems of equations | 3x − 15y = 0 |
| | | x + y = 7 |
| MT | matrices | $\begin{vmatrix} 2 & -4 & 0 \\ 12 & 9 & 0 \\ -256 & 3 & -5 \end{vmatrix}$ |

TABLE 3

Subroutines

| | Examples |
|---|---|
| UF Reduce fractions - as fractions | $\frac{3}{12}$ would print as $\frac{1}{4}$ |
| UF Reduce fractions as coefficients | $-\frac{5}{10}x^2 + \frac{2}{4}$ would print as $-\frac{1}{2}x^2 + \frac{1}{2}$ |
| UF Print improper fraction as mixed number and vice versa | $\frac{12}{5}$ or $2\frac{2}{5}$ |
| UF Determine if numbers are relatively prime (no common factor) | 3, 5, 14 are relatively prime |
| UF Find the lowest common multiple and greatest common factor | used for reducing fractions and simplifying polynomials |
| UF Simplify radicals | $\sqrt{100} = 10$ |
| | $\sqrt{24} = 2\sqrt{6}$ |

TABLE 3-continued

Subroutines

Examples

| | | |
|---|---|---|
| UF | Use quadratic formula and simplify answer | Send A, B, C, return x answer |

$$x = \frac{-B \pm \sqrt{B^2 - 4AC}}{2A}$$

| | | |
|---|---|---|
| UF | Comma routine | print 4 or more digit numbers with or without commas |
| UF | Space routine for comma | print 4 or more digit numbers with space in place of comma<br>34,478 would print 34 478 |
| UF | Translate numbers to words (Capitalize too) | 45 becomes forty-five<br>45 becomes Forty-five when starting a sentence |
| UF | Scientific notation and vice versa | $285,000 = 2.85 \times 10^5$<br>$0.0000033 = 3.3 \times 10^{-6}$ |
| UF | Round numbers to place value | Round 3.678 to nearest 0.1 = 3.7 |
| UF | Use significant digits | Print 45,689 with 3 significant digits<br>45,700 |
| UF | Other standard mathematical functions | absolute value, trig functions, log, factorial, standard deviation, etc. |

TABLE 4

Graphics

Examples

| | | |
|---|---|---|
| GF | Number lines | open/closed circles, arrows, shading, option to label tick marks |
| GF | Coordinate Graphs | x-y axes labels, arrows on axes and lines, plot points, label tick marks, background grid options |
| GF | Three dimensional graphs | x-y-z axes for calculus |
| GF | Graph functions | equations such as y = 3x + 2 conics |
| GF | Circle graphs (pie charts) | title, label sections, shade |
| GF | Bar graphs | title, label axes, etc. |
| GF | Line graphs | title, plot points, connect lines, etc. |
| IM | Simple geometric figures | triangles with angles and sides given, circles with radius, diameter rectangles, squares, other regular polygons |
| IM | Present data in tables | Spread sheet format |

The authoring tool 30 allows the user to create problems 32 by keying them from scratch, by duplicating existing problems and modifying the duplicate, or by editing preexisting problems. The outputs of the authoring tool 30 are individual problems, which are later aggregated into problem books 34. The content of each problem 32 includes an objective statement, descriptive characteristics, visual presentation, and variation rules (the language for expressing algorithms). The authoring tool 30 stores problem descriptions in files, one problem per file. Multiple problems are combined in one or more problem books 34. Each problem book 34 contains an index of problem content and an outline of the organization of that content. In addition, each problem book 34 is organized hierarchically into chapters sections, and objectives, with problems appearing under any, or multiple, levels.

As can be seen by reference to FIG. 3, using an editing window, the user selects the problem type (e.g., multiple choice, free response) and lays out the elements of the problem with menu and dialog choices. He or she keys in the text for the question, answer, distractor, and key sections in a fully style-enabled text editor. Mathematical expressions and other graphical objects can be embedded in-line with text.

Each problem 32 includes an objective which states the educational purpose of the problem 32. In addition, each objective will contain one or more keywords that relate to the problem content. Each problem 32 is characterized by the sophistication of the graphical representations it contains. The levels of representation are:

Textual—the problem 32 includes ASCII text.

Styled Text—the problem 32 includes font changes, bold, italic, superscript or subscript, but not mathematical expressions.

Expressioned—the problem 32 includes MathType expressions.

Graphical—the problem 32 includes graphic objects.

Further, each problem 32 is characterized by a level of difficulty using numeric values. For example:

level 0 is earliest pre-school;

level 9 is late finishing kindergarten;

level 120 is beginning 12th grade; and level 129 is finishing, 12th grade.

The authoring tool 30 allows problems 32 to be changed between answer formats without loss of information already entered. Users may select a multiple choice format with two to five candidate answers or distractors, one of which is correct; a true/false format; or a free response format, where an exam taker writes an answer long hand. In the multiple choice format, distractors have diagnosis information attached. This information describes, in words, the reasoning error that most likely led the student to arriving at the incorrect answer. The diagnosis information includes a diagnosis code for linking each error to remediation.

The size of any one problem 32 can be stored for adjusting page layout to minimize paper use. The size includes both height and width values. If the height and width are not predictable, zero values can so indicate.

In addition to the above features, the authoring tool 32 provides a problem description or variation rules language to allow for variation within a problem. Using this language, numeric parameters may vary so that multiple instances of one problem, subject to a set of variation rules (constraints), may be generated. The authoring tool 32 is designed so that numeric and text variable selection will allow for ranges, lists of items, and combinations of these. Value exclusion is accomplished in a similar manner.

Value exclusion is a method of excluding specific values of random variables so that inappropriate test questions are not produced as a result of the dynamic content capabilities of the present invention. For example, if an author creates a problem to test a student's understanding of subtraction prior to the student being taught how to evaluate negative numbers, the author would exclude values where the second number is less than the first number, thus eliminating the possibility of having problems where the proper answers would be a negative number.

In the example shown in FIG. 3, it can be seen that the question variation variables 42 are bracketed by the back quote character ('), for example, 'A' or 'B' or 'C'. It will be noted that one of the statements in the "Rules" box 36 is the following value exclusion statement 38: "require(A<>7)". This exclusion prevents the first portion of the question, 'A'/7, from evaluating to '1', so that the objective statement 40, "Add two simple fractions without reducing" is not violated.

Variables are used as elements of mathematical expressions, and as substitution string place holders. Whenever an instance of one problem 32 is generated (e.g., for preview in the authoring tool 30 or rendering by the print engine 60), values are computed for each of the variables according to the variation rules (described more fully below) and these values are substituted in the text or in the mathematical expression.

The text editor in the authoring tool 30 is style-capable. That is, it provides options to specify multiple typefaces, sizes, and styles within a problem. In addition, graphical elements (in formats such as PICT and TIFF) can be included as objects. Windows platform graphical objects such as BMP images may be included for display on systems using the Windows operating system. Editing and formatting tools for laying out problems with embedded graphics are provided through the use of a program called Paige, a routine called in the imager module (discussed below) of the print engine 60, which is available from DataPak Software, Inc., Vancouver, Wash.

Mathematical expression of equation layout is done using MathType, a function called from within the text editor in the authoring tool 30. MathType produces a formatted PICT which is integrated into the problem layout upon return to authoring tool. The interface between authoring tool 30 and MathType is the same as that between Microsoft Word and equation editor (a subset of MathType). (MathType is commercially-available from Design Science, Inc., Long Beach, Calif.) At any given instant, the user is operating within one of the two packages, each with its own menus, key assignments, etc.

PROBLEM BOOKS

As was discussed above, problem content is created by an author who is typically a professional programmer; but may be the end user of the test operating software running on the personal computer 13. The content of the problem is expressed in machine-usable form using the authoring tool 30, which stores each problem 32 in a separate file on disk. Problems 32 are organized for easy retrieval in a single disk file, i.e. one or more problem books 34. The set of programs that support collecting problems 32 into the problem books 34 is referred to as the build tools 70.

Each problem 32 is described by a few key parameters. These parameters assist the user in selecting problems 32 to include in a worksheet 50. Problems 32 within each problem book 34 are grouped into objectives. Objectives are grouped into sections and sections are grouped into chapters. Problems are not necessarily self-contained. They may refer to external objects, which are included in the representation at print time. Multiple problems can include the same external object. These objects are stored within the problem book 34 file.

As can be seen by reference to FIG. 4A, the build tools 70 include a book composer or assembly editor module 72 and a book builder module 74. As can be seen by reference to FIG. 4B, the assembly editor module 72 creates an assembly file 75. The assembly file 75 specifies the organization of the problems 32 by chapter and section. The book builder module 72 collects problems specified in the assembly file 75 into the book file or problem book 34. Each problem book 34 is generally restricted to problems in the same subject matter and grade level.

VARIATION RULES

The authoring tool 30 and print engine 90, discussed in greater detail below, use variation rules which are stored in the variation rules module or engine 80 (FIG. 8) and define instances of a generalized problem. The variation rules associated with a given problem 32 guide the replacement of variables incorporated in each problem 32. Variables may be replaced with numbers, text, graphics, or mathematical expressions. The variation rules for a problem 30 are an ordered list of definitions and constraints expressed in a simple language. The variation rules may assign substitution variables (variables used in the problem layout) or temporary variables (variables used only within the variation rules). The variation rules may also impose constraints on the relationship between variables.

To produce an instance of a problem 32, the list of variation rules is evaluated sequentially from top to bottom. If a constraint is not satisfied, the current pass through the list is abandoned and evaluation restarts from the top of the list. A valid instance of the problem results when the end of the variation rule list is reached.

Substitution variables are defined using the variation rule syntax, which is not case sensitive. This language supports basic mathematical operations, relational comparisons, and logical combinations using general expressions and operator rotation. Function (procedure) references provide extended capabilities.

The formal grammar (syntactical representation) of the variation rule syntax is shown in Appendix 1. The language allows for an assignment or function call on each line of programming code. The right-hand side of an assignment and the arguments of functions may themselves be expressions, which can include function calls. Parentheses can be used to force evaluation order, or simply for clarity. Mathematical expressions are general and follow Microsoft's Visual Basic™ rules for operator notation, precedence, and associativity, with the following exceptions:

| Visual Basic | Variation Rules |
|---|---|
| Not | ! |
| And | & |
| Or | \| |
| Xor | <<no equivalent>> |
| Eqv | <<no equivalent>> |
| Mod | mod( ) |
| & | + |

Table 5 presents some of the variation rules acceptable to the grammar.

TABLE 5

| Variation Rules | |
|---|---|
| D = random (D, −10, 10) | ; select numeric value from range |
| I = random (I, 1, 5) | ; select numeric value from set |
| A = select (I, 1, 2, 4, 6, 7) | |
| variable = select (I, "a", "b", "c", "x") | ; select text value from set |
| K = random (K, 1, 3) | ; select text value from set |
| color = select (K, "orange", "blue", "green") | |
| R = A ^ 2 + B ^ 2 | ; compute numeric value |
| require (R <= 30) | ; restrict numeric value |
| reject (A = B) | ; restrict combination of numeric values |
| require (A * B <> 8) | ; restrict combination of numeric values |
| reject (Perfect_square (A) ) | ; function call, restrict numeric value |
| require (rel_prime(A, B) ) | ; function call, restrict combination of values |
| K = random (K, 1, 3) | ; select numeric values from coherent sets |
| A = select (I, 3, 6, 5) | |
| B = select (I, 4, 8, 12) | |
| C = select (I, 5, 10, 13) | |
| B = select (A = −1, 10, 100) | ; logical selection (special case of select) |

All data variables manipulated by the variation rules—user-defined variables, internally generated variables, and literals—are of the same class. Members of this class (hereafter referred to as "standard data variables") have elements to hold integer, floating-point real, floating-point imaginary, string (text), PICT (graphic), and MathType fragment information. They also have an element to hold the "governing representation" that indicates which—zero or more—of these possible data representations are currently valid. An additional element holds formatting information, which is typically used to convert the integer or floating-point elements into a textual representation for imaging.

There are no declared types in the variation rules language. The governing representation of a variable can change through reassignment. Operations are deemed valid if the operator (or function call) supports the governing representation of the operand variables. Some operations permit more than one governing representation for a given operand and perform internal coercions (the coercion does not affect the variable's stored elements). For example, the binary mathematical operators will promote an integer operand if the other operand has a floating-point governing representation. In such a case, the integer operand remains an integer for later use.

The variation rules place no restrictions on the governing representation of arguments presented to operators. However, the various operators are defined for a subset of the allowable types. Initially, the mathematical, relational, and logical operators are defined for integer and floating-point types only, with the exception of "+," "=," and "<>." These latter operators are overloaded (i.e., they perform different operations depending on the data types supplied to them).

So, for example, they provide string concatenation and comparison when presented with string operands. The mathematical operators are shown in Table 6.

TABLE 6

| Mathematical Operators | |
|---|---|
| operator | interpretation |
| + | addition or unary plus |
| − | subtraction or unary minus |
| * | multiplication |

TABLE 6-continued

| Mathematical Operators | |
|---|---|
| operator | interpretation |
| / | division |
| ^ | exponentiation |

TABLE 7

| Relational Operators | |
|---|---|
| operator | returns true if |
| = | equal |
| <> | not equal |
| < | less than |
| > | greater than |
| <= | less than or equal |
| >= | greater than or equal |

TABLE 8

| Logical Operators | |
|---|---|
| operator | returns true if |
| & | and |
| \| | or |
| ! | not |

TABLE 9

String Operators

| operator | interpretation |
|----------|----------------|
| + | concatenation |
| operator | returns true if |
| = | equal (strings match) |
| <> | not equal (strings differ) |

When several operations occur in an expression, operations are performed in descending order of operator precedence. Among operations of equal precedence, evaluation proceeds from left-to-right. Table 10 lists the operators in decreasing order of precedence. Operators at the same level have equal precedence.

TABLE 10

Precedence

| | |
|---|---|
| ^ | exponentiation |
| +,− | unary plus, minus |
| *,/ | multiplication and division |
| \ | integer division |
| +,− | addition and subtraction |
| =,<>,<,>,<=,>= | comparison |
| ! | not |
| & | and |
| \| | or |

Parentheses can be used to force evaluation order because operations within parentheses are always performed before those outside. Within parentheses, the normal precedence rules apply. Parentheses can be nested to any depth.

After each statement has been evaluated, the variation rule engine 80 (FIG. 8) checks to see if the result variable (or result value) has the governing representation "CONSTRAINT." In particular, when the result variable has a "CONSTRAINT" governing representation, and the integer element of the result variable is zero (False), then the variation rule engine 80 abandons the current pass through the list and restarts from the top. If the integer element of the result variable is non-zero, processing continues with the next statement. Two internal library functions "REQUIRE" and "REJECT" provide the basic constraint facility, although other functions may produce "CONSTRAINT" results if necessary or useful.

Dynamic problems are varied using sequencing and randomization, which is accessed through standard functions. However, unlike simple mathematical functions (SQR, SIN, etc.) whose output depends solely on the current values of the inputs, the sequencing and randomization functions in the present invention require historical information to avoid problem repetition. Functions in this class are called memory functions (functions with a "memory" of their past values). Memory functions are responsible for creating and managing their own historical data storage. Some memory functions (including sequencing and randomization) need to determine the specific invocation (or call site) in the program. An additional argument—a sequence identifier—is required for these functions, along with the problem ID. The problem ID is passed automatically in the string element of the returned variable. The sequence identifier variable, specified by the user, is not modified by such a reference. For example, consider the statement:

A=random(A, 1,10)

On the first invocation, the random function will randomly shuffle the numbers 1 to 10, store them in a sequence unique to this problem ID and the (sequence) identifier "A", and return the first value in the sequence. On each subsequent invocation, the random function will return the next value in the sequence, wrapping around after the tenth value.

All functions return a standard data variable. The return variable is allocated by the caller and passed (by reference) as the first argument to the function. As such, a function with no explicit arguments will generate a call with one argument. Functions can have zero or more specified input arguments, all of which are standard data variables called by reference. That is, the function is passed a reference to the argument rather than a copy. Functions are able to modify any or all of the input arguments.

Functions can accept a variable number of arguments. The caller passes the number of arguments in the integer element of the return value. Using this count and the governing representation element of each variable, a function can handle any combination of input arguments. Restrictions on the number and governing representation of the arguments are only imposed and checked by the function.

If a function detects an error, it sets the returned argument governing representation element to ERROR and the string element to an appropriate error message. The caller must check for errors when the function returns. All function references are resolved by checking the external function library and then the internal function library. This search order allows functions with new capabilities or bug fixes to supersede those in the internal function library.

A number of standard functions are provided in an internal function library. These functions may be overridden by entries in external function libraries to add functionality or repair bugs. All internal functions attempt to return a sensible result given the governing representation of the input arguments. Certain functions operate only on certain governing representations. When the operation is not defined for the governing representation of the input, the operation reduces to nothing more than a copy of an input argument to the output. Mathematical operations use the integer or floating-point elements, according to the governing representation. In the function descriptions shown in Table 11, the formal input arguments (A, B, etc.) represent expressions. These expressions may include arithmetic operations, variables, constants, or other function calls.

TABLE 11

Functions

| Function | Result |
|----------|--------|
| random(A, B, C, D) | Returns a random number between (and including) B and C. The name "A", along with the problem ID, is used to uniquely identify the specific random sequence. If present, D represents the interval between random numbers. For example, the function call A = random(A, 1,2,0.1) will return one of the values 1.0,1.1,1.2, . . . 1.9, and 2.0 in random sequence. |
| select(I, A, B, C, . . .) | Returns the I'th element in the list (A, B, C, . . . ). I is used as an index. An index of 0 (the representation of False) will return the second choice (B). A negative index will return the first choice (A) and an index greater than the number of choices will return the last choice. Note that the result variable returned by the select function will be a copy of all elements of the selected choice. This means |

TABLE 11-continued

Functions

| Function | Result |
|---|---|
| | that the governing representation of the result may vary with the index. |
| require(A) | Returns a constraint failure if A is zero (False). |
| reject(A) | Returns a constraint failure if A is non-zero (True). |
| abs(A) | Returns the absolute value of A. |
| sgn(A) | Returns an integer corresponding to the sign of A. Returns −1,0, or 1 when A is less than zero, equal to zero, or greater than zero, respectively. |
| frac(A) | Returns the fractional part of A as a floating-point real. |
| int(A) | Returns the truncated value of A as an integer. |
| nint(A) | Returns the nearest integer to A. |
| sqr(A) | Returns the square root of A. |
| exp(A) | Returns e (base of natural logarithms) raised to the A power. |
| log(A) | Returns the natural logarithm of A. |
| sin(A) | Returns the sine of A (where A is in radians). |
| cos(A) | Returns the cosine of A (where A is in radians). |
| tan(A) | Returns the tangent of A (where A is in radians). |
| atn(A) | Returns the arctangent of A in radians. |
| atn2(A, B) | Returns the arctangent of A/B in radians, computed over four quadrants. |
| mod(A, B) | Returns the modulus or remainder of A divided by B. |
| max(A, B, C, . . .) | Returns a copy of the argument with the largest numerical value. In the case of a tie, the candidate argument nearest the front of the list is returned (e.g., if B and C are tied, B wins). |
| min(A,B,C, . . .) | Returns a copy of the argument with the smallest governing value. In the case of a tie, the candidate argument nearest the front of the list is returned (e.g., if B and C are tied, B wins). |
| perfect_square(A) | Returns True (1) if the input argument is a perfect square, False (0) otherwise. |
| rel_prime(A, B, C . . .) | Returns True (1) if all of the input arguments are relatively prime, False (0) otherwise. |
| pi( ) | Returns x (approximately 3.141592654). |
| e( ) | Returns e (approximately 2.718281828). |

The operation of the variation rules module 80 with respect to the question and answer key sections for a simple free-response answer format problem is shown in FIG. 5. (A multiple-choice problem would have many more sections, but all problems 30 are produced in the same manner.) The variation rules engine 80 processes the variation rules from a problem 30 from the top down. Each line of the rules specifies a calculation, a constraint, or a call to an external function. External functions perform frequently-needed operations. In the example shown in FIG. 5, the "random ( )" external function varies the number of apples and their price, so that each student receives a unique question. Calculations are performed as in any common programming language meaning that the result of each calculation is stored in a variable. Once the result is obtained, the constraints are checked and, if they are violated, the variation rules are restarted at the top, but with different random values. Upon reaching the bottom of the rules (by satisfying all constraints) the variable calculated during the processing are substituted in the question and other sections.

WORKSHEET EDITOR

As noted, the worksheet editor 45 allows the user to create the worksheets 50. Each worksheet 50 consists of a collection of problems 32 drawn from problem books 34, along with worksheet-level options to control printing. The worksheet editor 45 shown in FIG. 6 offers several commands: create a new worksheet; delete an existing worksheet; open an existing worksheet; save worksheet changes to disk; and print the worksheet. (See FIG. 7).

Worksheet 50 layout choices apply to the forms 65 as a whole, and to each problem 32 therein. Problem 32 layout choices override the per-worksheet choices. These choices are:

Answer side-by-side with question, or on a separate sheet.
Space preceding a question in inches, or default.
Space succeeding a question in inches, or default.
Minimum answer height in inches, or default.

The worksheet 50 does not actually store the problem 32 content itself, but rather a reference to each selected problem. In order to manipulate problems 32, the worksheet editor 45 offers these commands:

Add a problem to the worksheet.
Add multiple problems selected at random, meeting specified criteria (autoselect).
Remove a problem from the worksheet.
Adjust problem order on the worksheet.
Sort problems in order of source problem number, type, or difficulty.

Each Worksheet 50 has a header, which appears at the top of each page. Required commands are:

Edit header text.
Include date, time, or form number as part of the header.
Select header style (boxed, ruled, etc.).
Select to print on first page, after first page, or all pages.

PRINT ENGINE

The print engine 60 reads worksheets 50 and problem books 34. Further, the print engine 60 sequences through multiple students; question, answer, and key sheets for each student; and the problems 32 on each sheet. It then evaluates the random variations in the problem, stores key values for later use in scoring, and arranges the problems 32 and annotations on an output, which is either a printed sheet or a visual display on the video monitor 23.

As shown in FIG. 8, the print engine 60 consists of three main levels: a driver 90, layout logic 92, and an imager 94. The operation of the print engine 60 and, in particular, the chronological execution sequence of the programming logic for the print engine, in pseudo-code format, is shown in Appendices 2, 3, and 4. An abbreviated form of the code for the routines called in the driver 90, layout logic 92, and imager 94 is shown in Appendices 5–13. For the sake of brevity, only the most relevant portions of the code have been listed as those skilled in the art could readily construct the full code from the detail given.

The driver 90 sequences through the files containing data for the form 65 for each student, the files containing the question sheet 65a, answer sheet 65b, and answer key sheet 65c for each form 65, and the problems 32 for each sheet. Thus, the driver 90 calls the other levels of print engine 60 at the appropriate times. The driver 90 processes the problem content to generate random sequences, interpret the variation rules, and substitute variable values into the presentation sections. The variation rule engine 80 is part of the driver 90. As such, the variation rule engine 80 performs the actual interpretation of the variation rules and dispatches external functions.

Figure 9A:
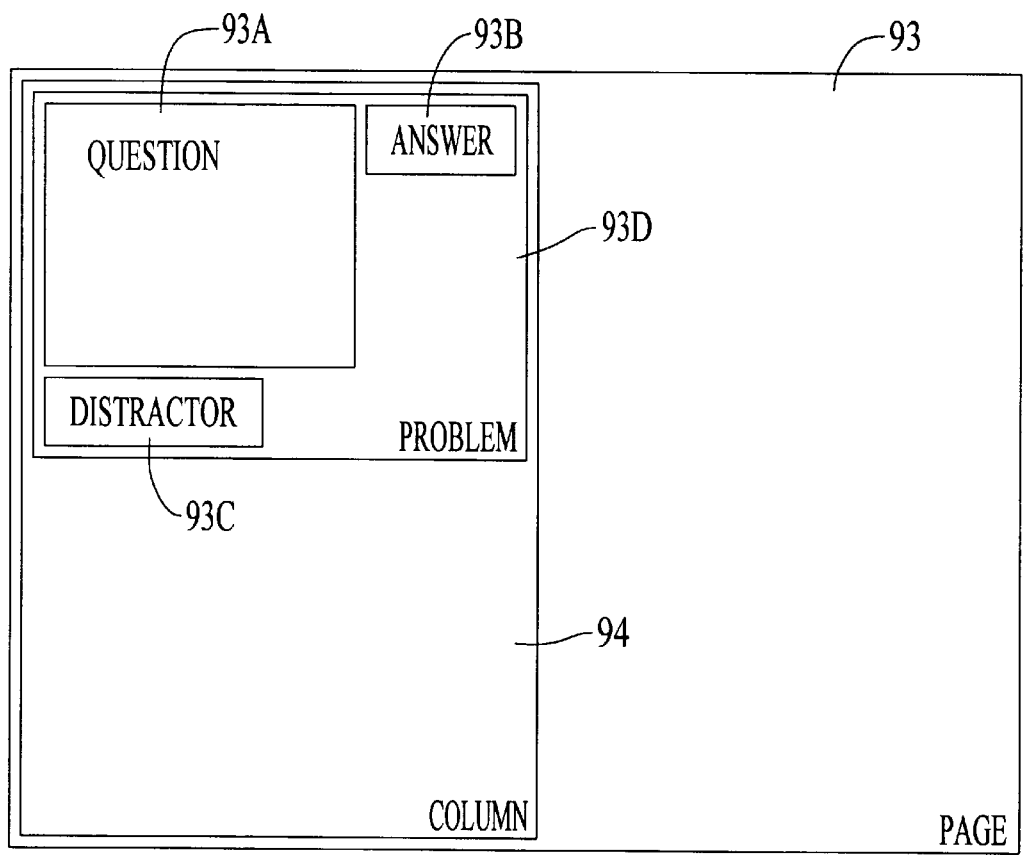
FIG. 9A is a schematic diagram showing how the present invention formats information on a printed examination or test.

As can be seen by reference to FIG. 9A, the layout logic 92 (FIG. 8) determines the pagination and placement of problems and annotations on the output shown as a page 93. It operates with rectangles, starting with smaller rectangles (question rectangle 93A, answer rectangle 93B, and distractor rectangle 93C which comprise a problem rectangle 93D) and aggregating them into larger rectangles (column 94), then filing them onto the large rectangle of the output page or form 65. The layout logic 92 is supplied with the worksheet 50 contents. This content is an ordered list of annotations and problem 32 references. The layout logic's operation is to compute the placement of these worksheet 50 items on one or more pages, called pagination. The processing follows the algorithm set forth in Table 12.

TABLE 12

Processing Algorithm

```
while worksheet items remain
    measure next worksheet item
    if the item fits on page
        place item on page
    else item needs a new page
        create a new page
        for each top-of-page annotation in order
            place annotation on top of remaining page
        for each bottom-of-page annotation in reverse order
            place annotation on bottom of remaining page
        place item on page
    end worksheet item placement
end of worksheet items
```

The layout logic 92 returns the list of pages to the driver 90 for eventual display, e.g., on a printed page or the video monitor 23.

Figure 9B:
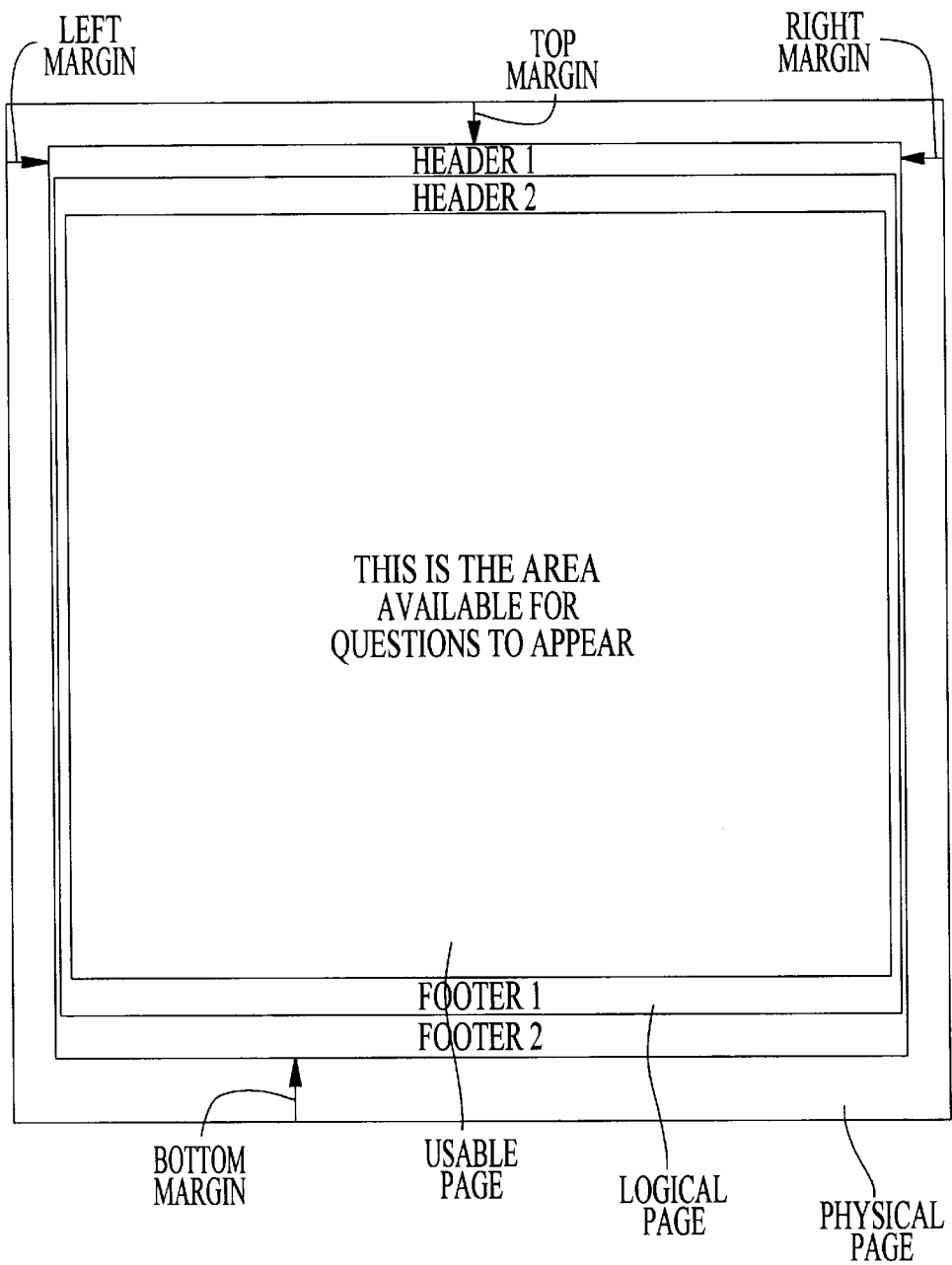
FIG. 9B is a schematic diagram showing how the present invention formats information on a printed examination or test.
Figure 9C:
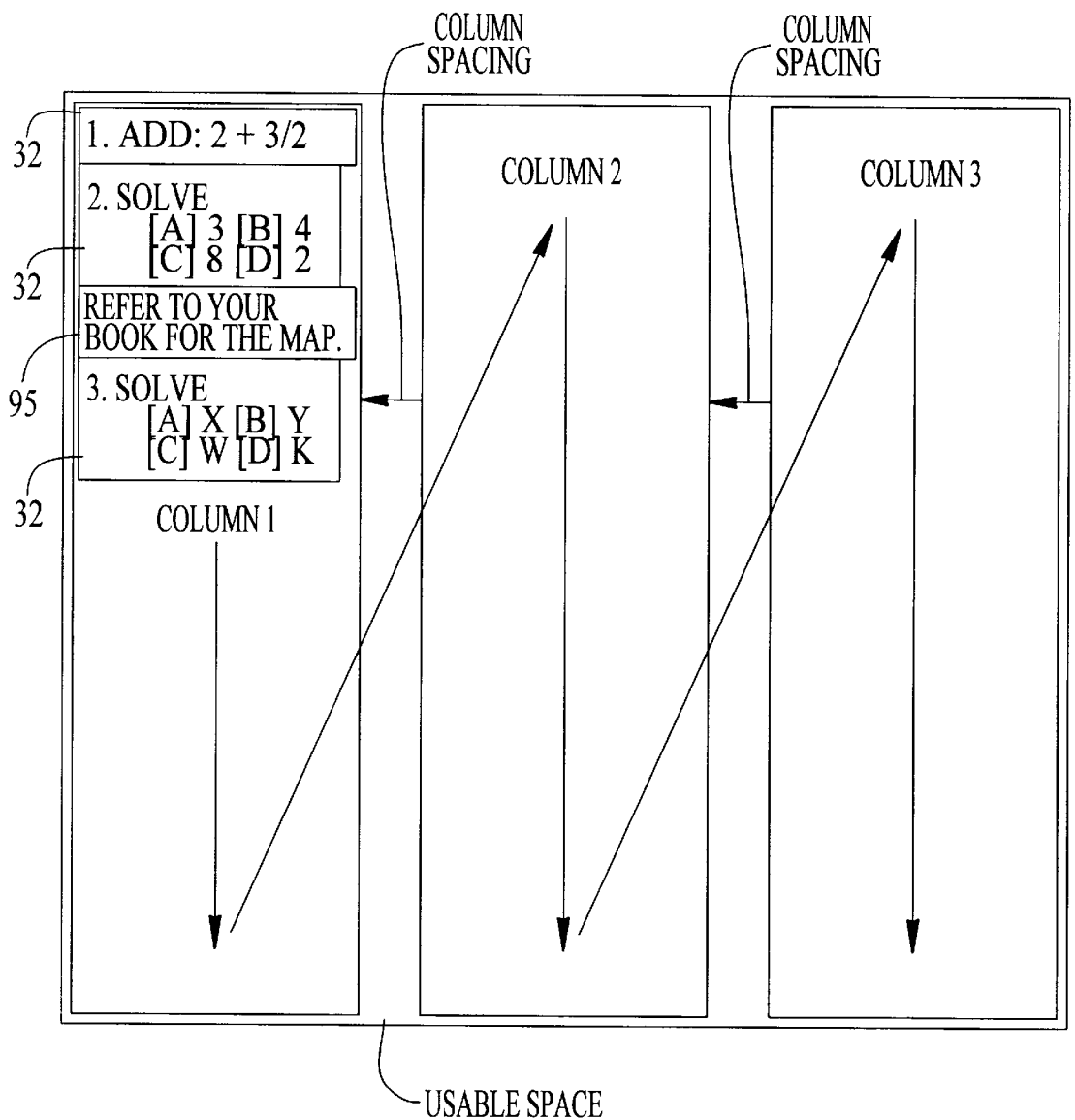
FIG. 9C is a schematic diagram showing how the present invention formats information on a printed examination or test.
Figure 9D:
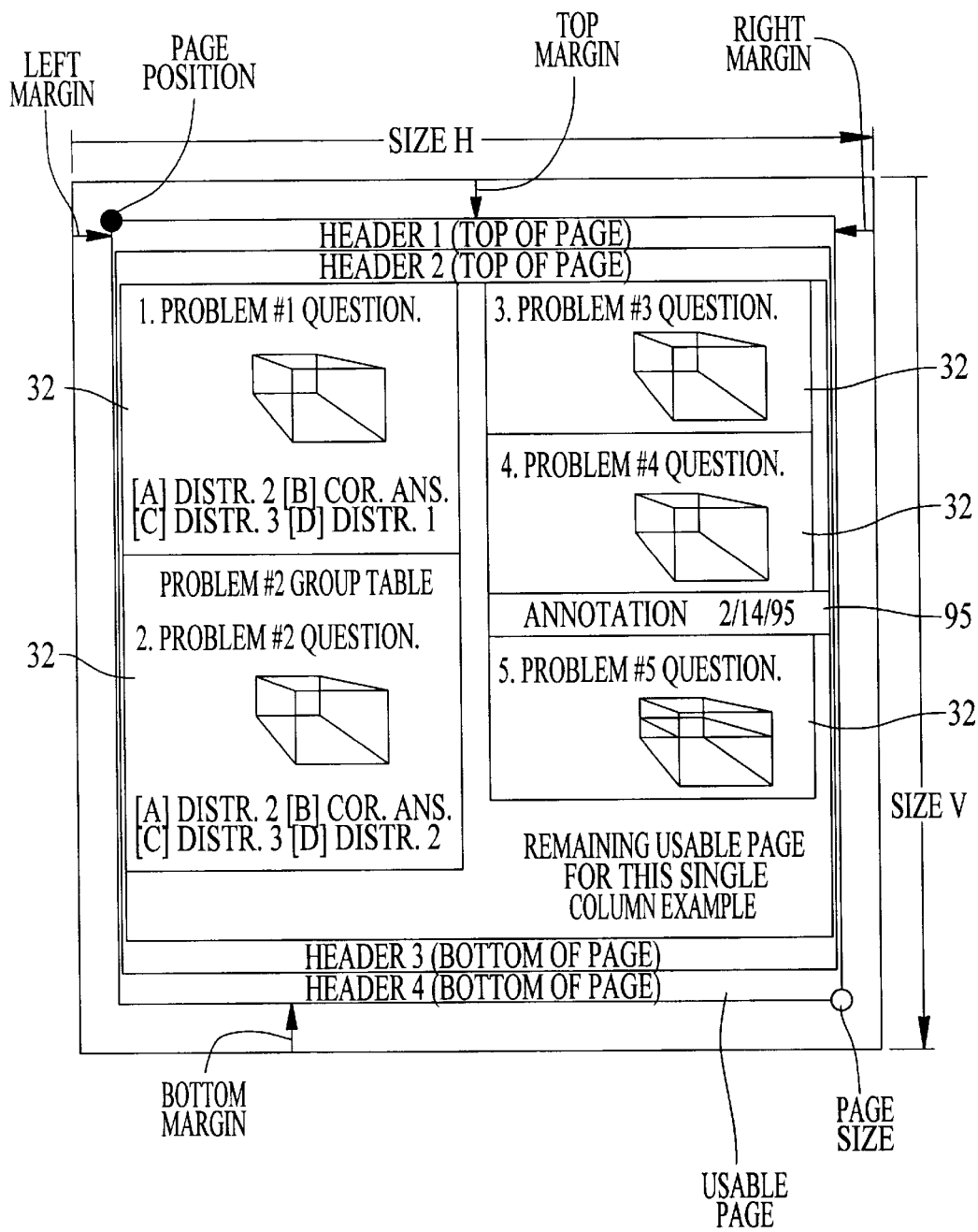

The layout logic 92 is provided with the dimensions of the output page 93 by the driver 90. The driver 90 also provides the layout logic 92, the four margins and the pixel density of the output page 93. The layout logic 92 uses these input parameters to calculate the usable page, which is the actual area into which annotations and problems 32 are drawn. These relationships are best understood by reference to FIGS. 9B–9D. The layout logic 92, like any word processor, recognizes the "physical page" size as the paper size selected by the user and supplied to the printer 22. The "logic page" is inset from the physical page by top, right, bottom, and left margins. The "usable page" is the portion of the logical page remaining after headers and footers are placed in the logical page. FIG. 9B shows the logical page with two headers and two footers, but there can be none, one, or many of each. As seen in FIG. 9C the usable page can be used as a single column or multiple columns. Generally, for reasons of readability, the maximum number of columns is six, although that number could change based upon the form factor of the sheet being printed on. The usable column width is the usable page, width minus required column spacing, divided by the number of columns. Questions or problems 32 are positioned starting with the top of column 1 and proceeding down until full, then continuing at the top of column 2, and so on until all columns are filled. As will be discussed in more detail, annotations 95 may be interspersed among printed problems 32. FIG. 9D shows a complete example of how the present invention organizes information for printing.

In addition to receiving dimension and margin pixel density parameters, the page parameters defined in Table 13 are provided from the driver 90 to the layout logic 92.

TABLE 13

Page Parameters

| variable name | units | source | description |
| --- | --- | --- | --- |
| resolution_h | pixels per inch | device | horizontal pixel density |
| resolution_v | pixels per inch | device | vertical pixel density |
| size_h | pixels | device | physical page width |
| size_v | pixels | device | physical page height |
| margin_left | points | user | inset from physical left edge to usable left edge |
| margin_top | points | user | inset from physical top edge to usable top edge |
| margin_right | points | user | inset from physical right edge to usable right edge |
| margin_bottom | points | user | inset from physical bottom edge to usable bottom edge |
| question_space | points | user | default height of space following a problem |
| answer_space | points | user | default height of space reserved for answer |

The parameters expressed in pixels are measured in the actual device (a printer or display screen) resolution. Parameters expressed in points are measured in 1/72" pixels. The layout logic 92 converts parameters from points to device pixels for its use.

Referring generally now to FIG. 10, each problem 32 from the worksheet 50 (FIG. 2C) is arranged in a problem layout frame 100 (equivalent to the problem rectangle 93D of FIG. 9A) that provides for the numerous sections that comprise its visual display. A free response problem can be as simple as just a question section (defined below). A multiple choice problem can have all of the sections shown in FIG. 10. The internal composition of each section is described later; first the spatial relationships between the sections are discussed.

The instructions section 102 exists if a problem 32 has instructions. The instructions section 102 is suppressed if the immediately preceding problem on the current page shared the identical instructions. This is referred to as instructions tracking. Assuming that the instructions exist and are not suppressed by instructions tracking, the instructions section 102 is placed at the upper left corner of the layout frame 100. The bottom of the instructions section 102 is padded by prob_group_v 103 to separate it from a question section 105.

A group section 107 exists if a problem 32 has a group name. The group section 107 is suppressed if the immediately preceding problem 32 on the current page shared the identical group name. This is referred to as group tracking. Assuming that the group section 107 exists and is not suppressed by group tracking, it is placed at the upper left corner of the layout frame 100, adjusted down by the presence of the instructions section 102. The bottom of the group section 107 is padded by prob_group_v 103 to separate it from the question section 105. Note that the instructions section 102 and the group section 105 are not typically both used on the same problem 32.

The question section 105 exists for every problem 32. The question section 105 holds the question for each question sheet 65a, the answer for each answer sheet 65b, and the key for each answer key sheet 65c. For a blank answer (a frequent case) the answer content is empty, but the problem number and an empty answer blank are still displayed.

Figure 11:
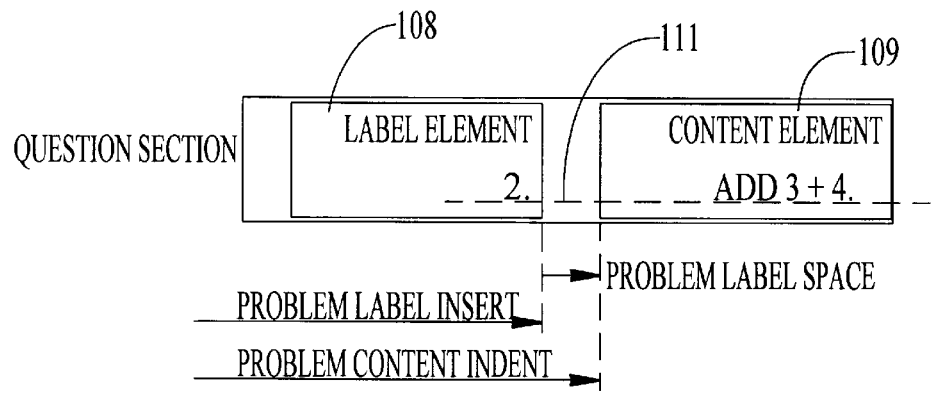
FIG. 11 is a schematic diagram showing how the present invention formats question labels and questions.

The questions section 105 has a label element 108 and a content element 109. As best seen by reference to FIG. 11, the label element 108 is the problem number followed by appropriate punctuation. The label element 108 is right justified to the problem label inset. The space between the label element and the content element is the problem label space. The content element 109 is left justified to the problem content indent. The problem number and problem content are vertically aligned by a base line 111. Referring again to FIG. 10, if a problem is a multiple-choice problem, it has a correct and one or more incorrect answers. All of the answers (correct and incorrect) are collectively referred to as distractors (discussed blow). The distractors arc placed in a distractor section 112. A distractor section doe, not exist for true-false or free-response questions. An answer section 113 exists if the worksheet 50 is set to "Answer Next to Question." The answer section 113 holds the answer content, if any exists. The placement of distractors and of the answer section 113 is described below.

Figure 12:
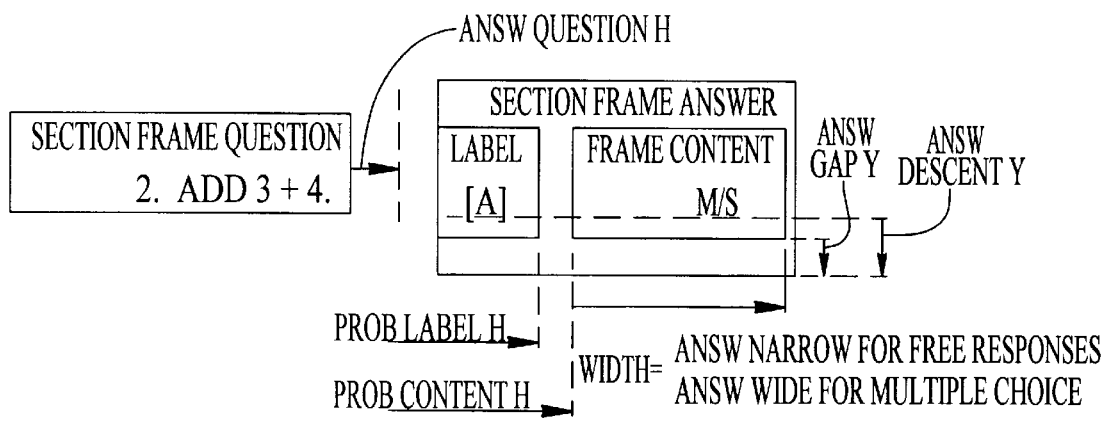
FIG. 12 is another schematic diagram showing how the present invention formats question labels and questions.
Figure 13:
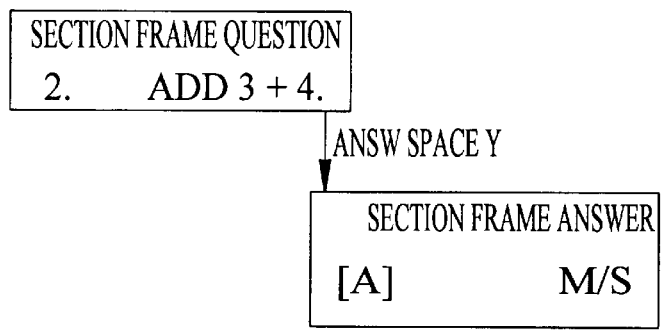
FIG. 13 is another schematic diagram showing how the present invention formats question labels and questions.

For the "Answer Next to Question Layout," the answer blank is placed to the right of the question if it fits, as shown in FIG. 12. If the answer and question do not fit on the same line, the answer appears underneath, as shown in FIG. 13.

As can be seen by reference to FIG. 14, each distractor section 112 includes one or more distractors 115. Each distractor 115 has a designation such as a letter (upper or lower case) or numeral (Arabic or Roman). Each distractor section 112 includes a label element 116 and a content element 118. The label element 116 includes the distractor designation followed by appropriate punctuation. The content element 118 contains tile correct answer or one of the incorrect answers. The label element 116 is right justified to the distractor label inset and the label element 116 and the content element 118 are separated by the distractor label space 119. The content element 118 is left justified to the distractor content indent. The label element 116 and content element 118 are vertically aligned along a base line 125.

The distractors 115 are arranged to the right or underneath the question section 105. They are arranged on one to five rows, with as many on each row as reasonably fit. Some distractors can be placed on a lower row to balance out the number per row, but not at the expense of creating an additional distractor row. The priorities for distractor spreading versus number of distractors are shown in Table 14, below.

to place three distractors on one distractor line and two on the next. This is shown in FIG. 17. Other arrangements follow the constraints indicated above. The logic followed by the layout logic 92 is described in greater detail in appendices 14 and 15.

The layout logic 92 also controls the display of answer and key sections. An exemplary answer section or key section 140 is shown in FIG. 18. The answer/key section 140 includes a label element 142 and a content element 144. The label element includes a designation 145, selected to match the designation of the corresponding question, together with appropriate punctuation, and is right justified to the problem label inset. The content element 144 is left justified to the problem content indent and both elements 142 and 144 are vertically aligned on the base line 146. In an answer section 144 a horizontal line 148 is provided as a place for a test taker to put his or her answer. In a free response format the line 148 may be replaced by one or more lines (not shown) that extend across the answer sheet 65b.

As noted above, the third component of the print engine 60 is the imager 94. The imager 94 understands the actual graphical appearance of problems 32 and annotations on the output. It can measure these items to determine their dimensions and draws them on the output device such as the video monitor 23 and printer 22. When measuring an item, the height may depend on the width, so the layout logic 92 provides the imager 94 with a bending rectangle into which the item should fit. Typically, the bounding rectangle will constrain width, but not height. Thus, for example, the layout logic 92 might try to fit an item within half of the page width if a two column layout for a test or examination is desired.

As can be seen from the above, the present invention provides an effective mechanism for producing examinations with dynamic content and presentation. However, while it has been described in what are believed to be the most preferred forms, it is to be understood that the present invention is not confined to the particular construction and arrangement of the components herein illustrated and described, but embraces such modified forms thereof as come within the scope of the following claims.

TABLE 14

Distractor Priorities

| Priority | Three | Four | Five |
|---|---|---|---|
| 1 | | All on the same line as the question. | |
| 2 | | All on the same line below the question. | |
| 3 | Fill per line | 2 on 1st line, 2 on 2nd line | 3 on 1st line, 2 on 2nd line |
| 4 | One per line | Fill per line | 2 on 1st line, 3 on 2nd line |
| 5 | | One per line | Fill per line |
| 6 | | | One per line |

The "Fill per line" notation means that each line contains as many distractors as fit, with the remainder continuing on the following line. This can produce a variety of patterns, such as 1 on the first line, 3 on the second line and 1 on the third line; or 2 on the first line, 1 on the second line and 2 on the third line. While these layouts might seem unusual, they can result in a more efficient use of space on the question sheets 65a. The first choice is to place distractors on the same line with the question, if they satisfy the spacing and gridding constraints, as shown in FIG. 15. The second choice is to place distractors all on the same line following the question, if they satisfy the spacing and gridding constraints, as shown in FIG. 16. The third choice for five-distractor problems is

What is claimed is:

1. A system for creating a test with one or more questions that contain one or more mathematical expressions from a collection of question data files, each question data file containing at least one content item, at least one corresponding label item, and a set of initial variables whose values are determined according to a set of variation rules, the system comprising:

a data processor having a means for storing at least one computer program; and means for printing indicia on paper, said means coupled in data communication with the data processor;

the data processor including:
- a print engine having:
  - means for sequencing through selected question data files;
  - means for determining the placement of the content and label items of the selected question data files on a printed sheet;
  - means for measuring the dimension of each content and each label item; and
  - means for processing the variation rules and replacing each of the initial variables with a result value.

2. A system as claimed in claim 1, further comprising means for transferring data containing the placement and dimension of the content and label items to the means for printing indicia.

3. A system as in claim 1, wherein the variation rules for each question specify a mathematical calculation, a logical calculation, a constraint, or a call to a function.

4. A system as in claim 1, wherein the means for processing the variation rules calls memory sequencing functions and memory randomizing functions.

5. A system as in claim 1, wherein the means for determining the placement of the content and label items positions said items within calculated rectangles.

6. A method of creating a test with one or more questions that contain one or more mathematical expressions using a data processor and a means for printing indicia coupled in data communication to the data processor, the data processor having a storage means and the storage means having stored thereon a collection of question data files, each question data file containing content items, label items, and a set of initial variables whose values are determined according to a set of variation rules, the method comprising the steps of:
- selecting a number of question data files;
- sequencing through the selected question data files;
- determining the placement of the content and label items of the selected question data files on a printed sheet;
- measuring the dimension of each content and each label item;
- transferring data containing the placement and dimension of the items to the means for printing indicia; and
- processing the variation rules and replacing each of the initial variables with a result variable.

7. A method as in claim 6, wherein the variation rules for each question specify a mathematical calculation, a logical calculation, or a call to a function.

8. A method as in claim 6, wherein one or more of the initial variables has a constrictive governing representation and the result variable for each initial variable with a constrictive governing representation has an integer element and the variation rules are processed to determine whether each integer element is false.

9. A method as in claim 6, wherein the step of determining the placement of the content and label items positions includes fitting said items within calculated rectangles.

10. A system for creating a test with one or more question, from a collection of question data files, each question data file containing at least one content item, at least one corresponding label item for the at least one content item, and a set of initial variables whose values are determined according to a set of variation rules, the system comprising:
- a data processor having means for storing at least one computer program; and
- means for presenting human readable output coupled in data communication with the data processor;
- the data processor including:
  - a print engine having:
    - means for sequencing through selected question data files;
    - means for determining the placement of the content and label items of the selected question data files on a printed sheet;
    - means for measuring the dimension of each content and each label item; and
    - means for processing the variation rules and replacing each of the initial variables with a result value.

11. A method of producing a set of examinations having both dynamic content and dynamic presentation, the method comprising the steps of:
- creating a collection of question data files, each question data file containing at least one content item, at least one corresponding label item for the at least one content item, and a set of initial variables whose values are determined according to a set of variation rules,
- selecting a number of the question data files;
- sequencing through the selected number of question data files;
- determining the placement of the content and label items of the selected number of question data files on a printed sheet;
- measuring the dimension of each content and each label item; and
- processing the variation rules and replacing each of the initial variables with a result value.

12. A method as in claim 11, wherein the variation rules for each question specify a mathematical calculation, a logical calculation, a constraint, or a call to a function.

13. A method as in claim 11, wherein the step of determining the placement of the content and label items positions includes fitting said items within calculated rectangles.

* * * * *

UNITED STATES PATENT AND TRADEMARK OFFICE
CERTIFICATE OF CORRECTION

PATENT NO. : 6,018,617
DATED : January 25, 2000
INVENTOR(S) : Masahiro Yanagisawa It is certified that error appears in the above-identified patent and that said Letters Patent is hereby corrected as shown below:

Title Page:
[73] delete "Takeuchi Industrial Co., Ltd." and insert --NEC Corporation--

Signed and Sealed this

Twenty-fourth Day of April, 2001

Attest:

NICHOLAS P. GODICI

*Attesting Officer*        *Acting Director of the United States Patent and Trademark Office*